United States Patent
Akiyama et al.

(10) Patent No.: US 7,555,651 B2
(45) Date of Patent: Jun. 30, 2009

(54) TIME MANAGEMENT APPARATUS AND TIME MANAGEMENT METHOD

(75) Inventors: Ryota Akiyama, Kawasaki (JP); Masamichi Ishibashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 877 days.

(21) Appl. No.: 11/063,046

(22) Filed: Feb. 22, 2005

(65) Prior Publication Data
US 2005/0152213 A1 Jul. 14, 2005

Related U.S. Application Data

(63) Continuation of application No. PCT/JP2004/001271, filed on Feb. 6, 2004.

(30) Foreign Application Priority Data
May 28, 2003 (WO) .................. PCT/JP03/06669

(51) Int. Cl.
*H04L 9/00* (2006.01)
(52) U.S. Cl. .......................... 713/176; 713/178
(58) Field of Classification Search .............. 726/23, 726/26, 27, 34; 713/176, 178–179, 194, 713/400, 168
See application file for complete search history.

(56) References Cited

U.S. PATENT DOCUMENTS

| | | | |
|---|---|---|---|
| 5,798,719 A * | 8/1998 | Wise et al. ............... | 341/67 |
| 2002/0026290 A1 | 2/2002 | Ozaki | |
| 2002/0181332 A1 | 12/2002 | Aucsmith | |

FOREIGN PATENT DOCUMENTS

| | | |
|---|---|---|
| DE | 42 40 771 | 6/1993 |
| EP | 1 081 564 | 3/2001 |
| JP | 55-134381 | 10/1980 |
| JP | 58-182582 | 10/1983 |
| JP | 61-255421 | 11/1986 |
| JP | 63-163191 | 7/1988 |
| JP | 5-165545 | 7/1993 |
| JP | 5-303516 | 11/1993 |
| JP | 6-202757 | 7/1994 |
| JP | 6-258460 | 9/1994 |
| JP | A 6-265650 | 9/1994 |
| JP | 10-032860 | 2/1998 |

(Continued)

*Primary Examiner*—Hosuk Song
(74) *Attorney, Agent, or Firm*—Greer, Burns & Crain, Ltd.

(57) ABSTRACT

It is an object of the present invention to provide a time management apparatus and a time management method for reducing the opportunity for a third party to intentionally tamper with time. In order to achieve this object, the present invention is provided with time management apparatus including an external time fetching part for fetching an external time within a predetermined time span, a local clock part for outputting a self-advance time, and a time difference judgment part for calculating a difference between the external time fetched by the external time fetching part and the self-advance time output by the local clock part, setting the external time to the local clock part in a case where the difference is less than a predetermined value, and not setting the external time to the local clock part in a case where the difference is equal to or more than a predetermined value.

20 Claims, 18 Drawing Sheets

FOREIGN PATENT DOCUMENTS

| | | |
|---|---|---|
| JP | 10-136456 | 5/1998 |
| JP | 10-170667 | 6/1998 |
| JP | 2000-65966 | 3/2000 |
| JP | 2000-199792 | 7/2000 |
| JP | 2002-22863 | 1/2002 |
| JP | 2002-063614 | 2/2002 |
| JP | 2002-185449 | 6/2002 |
| JP | 2002-236187 | 8/2002 |
| JP | 2002-374473 | 12/2002 |
| JP | 2003-004876 | 1/2003 |
| JP | 2003-218860 | 7/2003 |
| JP | 2003-524348 | 8/2003 |
| WO | WO 97/09658 | 3/1997 |
| WO | WO 01/63927 | 8/2001 |

* cited by examiner

FIG.14

| RADIO-WAVE RECEPTION TIME t' | RADIO-WAVE CLOCK TIME t | SIGNATURE ISSUE TIME ts | ERROR ABSOLUTE VALUE \|t-t'\| = δt | AUTHENTICATION CODE CS |
|---|---|---|---|---|
| t1' | t1 | ts11<br>ts12<br>·<br>ts1m | δt1 | CS1<br>CS11<br>CS12<br>·<br>CS1m |
| t2' | t2 | ts21<br>ts22 | δt2 | CS2<br>CS21<br>CS22 |
| t3' | t3 | | δt3 | CS3 |
| ⋮ tn' | ⋯ tn | | ⋯ δtn | ⋯ CSn |

1302

1420 — (ts11...ts1m, CS11...CS1m group)
1421 — (ts21, ts22, CS21, CS22 group)

1401 — RADIO-WAVE RECEPTION TIME t'
1402 — RADIO-WAVE CLOCK TIME t
1403 — SIGNATURE ISSUE TIME ts
1404 — ERROR ABSOLUTE VALUE
1405 — AUTHENTICATION CODE CS 1410, 1411, 1412, 1413

TIME MANAGEMENT APPARATUS AND TIME MANAGEMENT METHOD

CROSS-REFERENCE TO RELATED APPLICATIONS

This application is a U.S. continuation application filed under 35 USC 111(a) claiming benefit under 35 USC 120 and 365(c) of PCT application JP 2004/001271, filed Feb. 6, 2004, which claims priority to PCT Application Ser. No. JP 2003-006669, filed in Japan on May 28, 2003. The foregoing application is hereby incorporated herein by reference.

BACKGROUND OF THE INVENTION

1. Field of the Invention

The present invention relates to a time management scheme, and more particularly, a time management apparatus and a time management method for reducing the opportunity for a third party to intentionally tamper with time.

2. Description of the Related Art

Currently, a time stamp is employed for certifying the time in which a file for use has been made by using a computer and thereby ensuring security. Idealistically, it would be most preferable to provide this time stamp from an error-less clock maintained inside a computer or the like.

However, in reality, errors do occur in the clock provided inside a computer. Therefore, correction is required to be periodically performed by employing a clock serving as a criterion. One example as a clock serving as the criterion for correction is a radio-wave clock.

With a conventional technology, in a case where external time information, which is transmitted by radio wave from a radio-wave clock, is receivable by a time management apparatus, the time management apparatus calibrates using the transmitted external time information. On the other hand, in a case where the external time information cannot be received, time information from a built-in local clock is used without performing calibration.

In this case, however, there is a problem that public time information transmitted from the radio-wave clock cannot be used as a digital signature time stamp since there is a possibility that the time indicated by the local clock is freely tampered by using a false radio-wave clock transmitter.

Furthermore, with a conventional technology, in a case where the local time indicated by the time management apparatus is earlier than an external time provided from outside, the time output from the time management apparatus slightly returns to a time of the past when the external time from outside is fetched into the time management apparatus. In such a case, the time stamp of the time period indicated by the time of the past loses credibility.

Furthermore, a method of certifying the validity of the time of a time stamp is desired.

Furthermore, the documents below describe technology related to the present invention: Japanese Laid-Open Patent Application Nos. 6-258460, 2003-4876, 2002-236187, 2002-63614, 2002-185449, 2003-218860, and 2003-524348.

SUMMARY OF THE INVENTION

In light of the foregoing, it is an object of the present invention to provide a time management apparatus and a time management method for reducing the opportunity for a third party to intentionally tamper with time.

In order to achieve the object the time management apparatus of the present invention includes an external time fetching part for fetching an external time within a predetermined time span, a local clock part for outputting a self-advance time, and a time difference judgment part for calculating a difference between the external time fetched by the external time fetching part and the self-advance time output by the local clock part, setting the external time to the local clock part in a case where the difference is less than a predetermined value, and not setting the external time to the local clock part in a case where the difference is equal to or more than a predetermined value.

With the present invention, unlike the conventional technology which switches between setting the external time information to the local clock and allowing self-advance of the local clock, depending simply on whether external clock information is receivable, the present invention periodically or randomly fetches time information provided from the outside for a predetermined period of time, obtains the time error with respect to the local time information inside the apparatus, and outputs to set the external time or allow self-advance of the local time depending on whether it is greater than or less with respect to the value of the error. Accordingly, a time management apparatus and a time management method for reducing the opportunity for a third party to intentionally tamper with time can be provided.

Furthermore, for achieving the object, a time management apparatus of the present invention includes an external time fetching part for fetching an external time within a predetermined time span, a local clock part for outputting a self-advance time, a time difference judgment part for calculating a difference between the external time fetched by the external time fetching part and the self-advance time output by the local clock part, setting the external time to the local clock part in a case where the difference is less than a predetermined value, and not setting the external time to the local clock part in a case where the difference is equal to or more than a predetermined value, and a time output ceasing part for ceasing output of time by the local clock part in a case where the external time set to the local clock part is a time of the past with respect to a time output by the local clock part immediately before setting the external time to the local clock part, until the time output by the local clock part reaches the time of the past output by the local clock part immediately before setting the external time to the local clock part.

With the present invention, the time output from the time management apparatus and the time management method does not return to the time of the past. Therefore, the time management apparatus and the time management method for reducing the opportunity of intentional tampering of time can be provided.

Furthermore, it is an object of the present invention to provide an apparatus for authenticating validity of the time of the time stamp.

For achieving the object, a time management apparatus of the present invention includes an external time fetching part for fetching an external time within a predetermined time span, a local clock part for outputting a self-advance time, a time difference judgment part for calculating a difference between the external time fetched by the external time fetching part and the self-advance time output by the local clock part, setting the external time to the local clock part in a case where the difference is less than a predetermined value, and not setting the external time to the local clock part in a case where the difference is equal to or greater than a predetermined value, a part for generating a first authentication code by performing a signature on the self-advance time, the external time, and the difference by using a predetermined key, a part for storing the self-advance time, the external time, the difference, and the first authentication code, a reception part for receiving a signature issue command, a part for generating a second authentication code by performing a signature by using a predetermined key at a predetermined signature issue time in accordance with the signature issue command received by the reception part, and a part for storing the signature issue time and the second signature authentication code.

BRIEF DESCRIPTION OF THE DRAWINGS

Further objects, features and advantages of the present invention will become more apparent from the detailed description and the accompanying drawings.

FIG. 14 is a drawing showing a configuration of a history memory according to a fifth embodiment of the present invention;

DESCRIPTION OF THE PREFERRED EMBODIMENTS

Embodiments of the present invention are described below with reference to the drawings.

Figure 1:
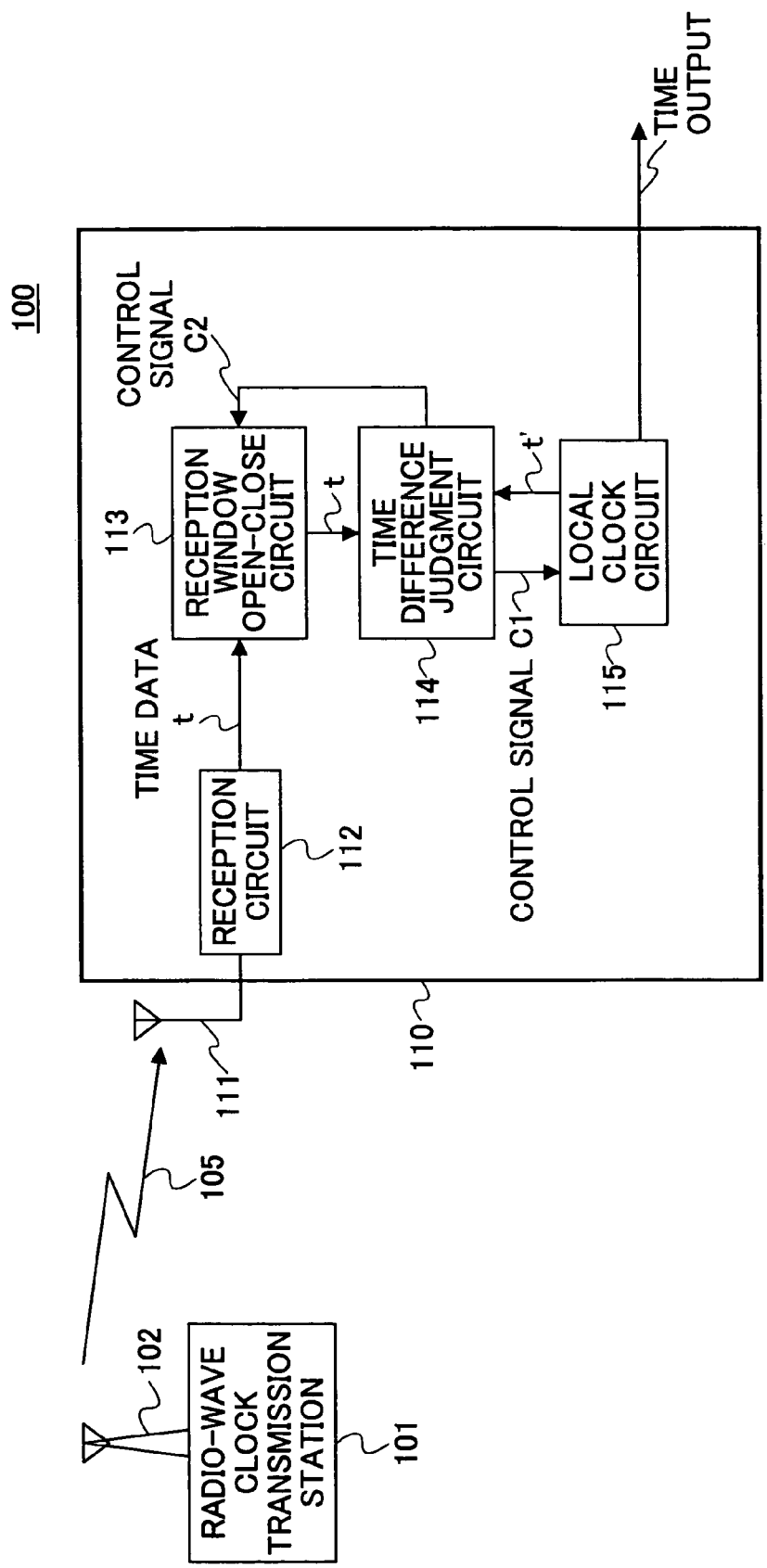
FIG. 1 is a drawing showing a first embodiment of a principle of the present invention.

FIG. 1 is a drawing showing a time management system 100 in a first embodiment for showing a principle of the present invention. In FIG. 1, the time management system 100 mainly includes a radio-wave clock transmission station 101 and a time management apparatus 110. The radio-wave transmission station 101 transmits external time information 105 from a transmission antenna 102. The time management apparatus 110 in FIG. 1 mainly includes a reception antenna 111, a reception circuit 112, a reception window open-close circuit 113, a time difference judgment circuit 114, and a local clock circuit 115.

The reception circuit 112 in the time management apparatus 110 of FIG. 1 receives the external time information 105 from the radio-wave clock transmission station 101 via the antenna 111, and supplies it to the reception window open-close circuit 113 as time data t. The format of the external time information 105 is described below with reference to FIG. 5.

The local clock circuit 115, after once being set to an initial value, self-advances and outputs time data t'.

The reception window open-close circuit 113 opens a reception window according to a control signal C2 supplied from the time difference judgment circuit 114, and sends time data t input during this interval to the time difference judgment circuit 114.

Meanwhile, the local clock circuit 115 also supplies time data t' to the time difference judgment circuit 114.

The time difference judgment circuit 114 calculates the absolute value δt of the difference between the time date t and the time data t'. Then, in a case where the absolute value δt is less than a predetermined value σ, the time control difference judgment circuit 114 controls the local clock circuit 115 for enabling the time data t to be set thereto by using a time set control signal C1. On the other hand, in a case where the absolute value δt is equal to or greater than the predetermined value σ, the time control difference judgment circuit 114 controls the local clock circuit 115 for enabling the local clock circuit 115 to continue self-advancing by using the time set control signal C1.

Next, after the local clock circuit 115 is controlled for setting the time data t thereto and restarting or for self-advancing by the control signal C1, the time control difference judgment circuit 114 closes the reception window of the reception window open-close circuit 113 by using the control signal C2. Thereby, the local clock circuit 115 is allowed to self-advanced since no time data t input from the reception circuit 112 to the reception window open-close circuit 113 is supplied to the time control difference judgment circuit 114.

Then, when reaching a predetermined time T, the time control difference judgment circuit 114 once again sends a control signal C2 to the reception window open-close circuit 113 and controls the reception window for allowing it to open. Accordingly, the foregoing operation is repeated.

Accordingly, a time management system 110, which is strong against time tampering and also able to provide a highly accurate time for a long period, can be obtained.

Next, a second embodiment of the present invention is described in further detail with reference to FIGS. 2, 3, 4, 5, 6 and 7.

Figure 2:
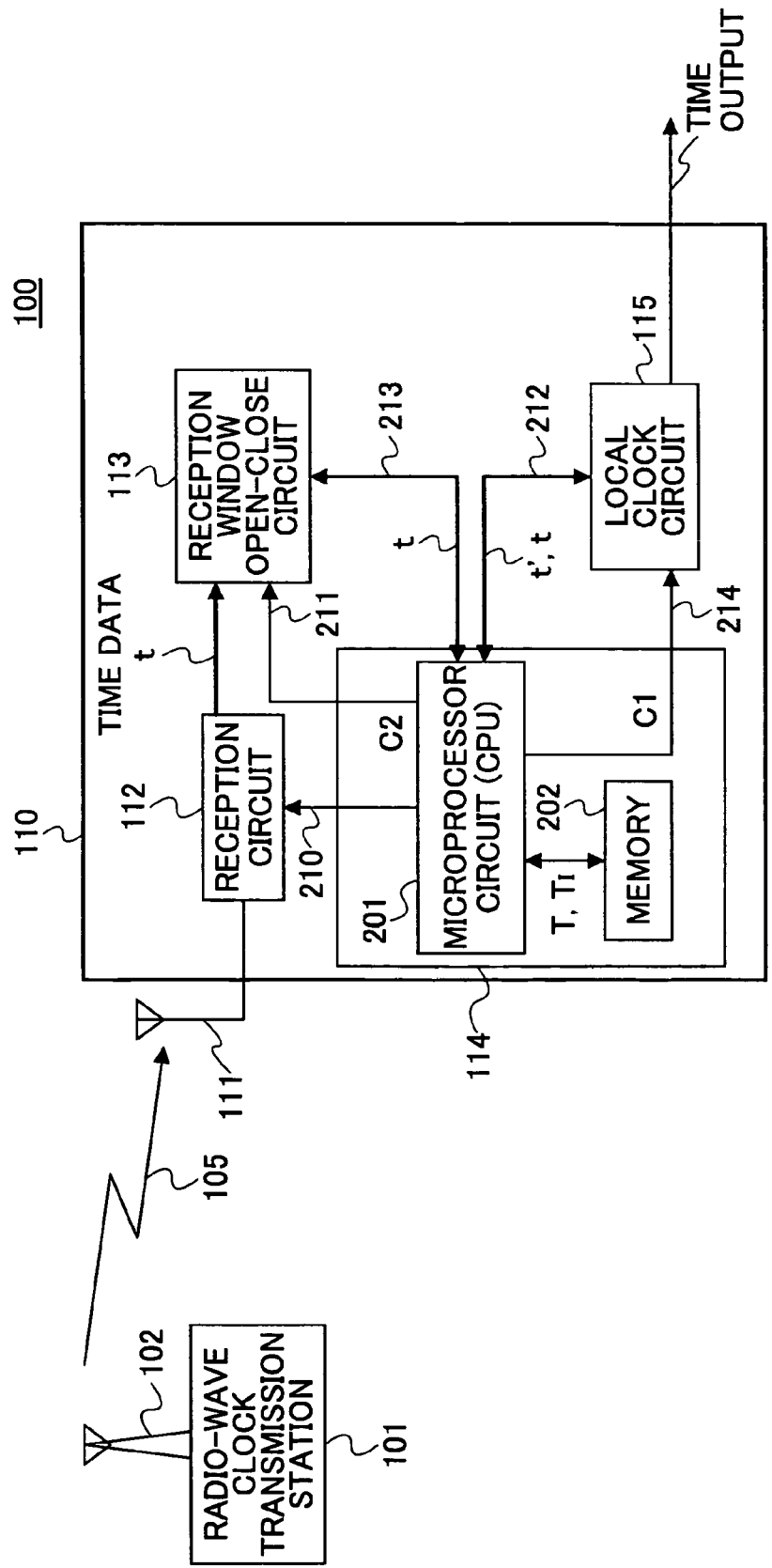
FIG. 2 is a drawing showing a configuration of a second embodiment of the present invention.

FIG. 2 is a drawing showing a configuration of a time management system 100 according to the second embodiment of the present invention. The time management apparatus 100 shown in FIG. 2 mainly includes a radio-wave clock transmission station 101 and a time management apparatus 110. In the time management system of FIG. 2, like components are denoted by like numerals as of FIG. 1. The time control difference judgment circuit 114 in the time management apparatus 110 of FIG. 2 mainly includes a microprocessor (CPU) 201 and a memory 202.

Figure 3:
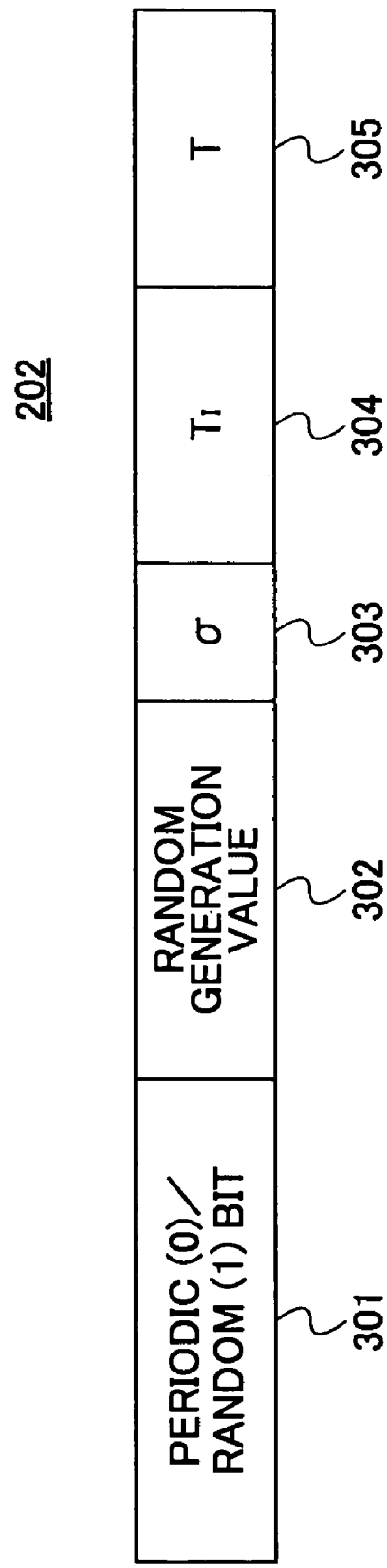
FIG. 3 is a drawing showing a configuration of a memory according to a second embodiment of the present invention.

FIG. 3 is a drawing showing a configuration of a memory according to the second embodiment of the present invention. The space 301 in the memory 202 stores information indicating whether to periodically set time data t to the local clock circuit 115 or to set time data t to the local clock circuit 115 at random intervals of time. In this embodiment, "0" is stored in a case of periodically setting time data t to the local clock circuit 115, and "1" is stored in a case of setting time data t to the local clock circuit 115 at random intervals of time. The space 302 in the memory 202 stores a random generation value which is the interval time value in the case where time data t is set to the local clock circuit 115 at random intervals of time. The space 303 in the memory 202 stores the predetermined value σ which serves as the criterion for determining the above-described absolute value δt. The space 304 in the memory 202 stores an interval time value $T_I$ in the case where time data t is periodically set to the local clock circuit 115. Furthermore, the space 305 in the memory 202 stores time T which is the next time at which time data t is to be set to the local clock circuit 115.

Figure 4:
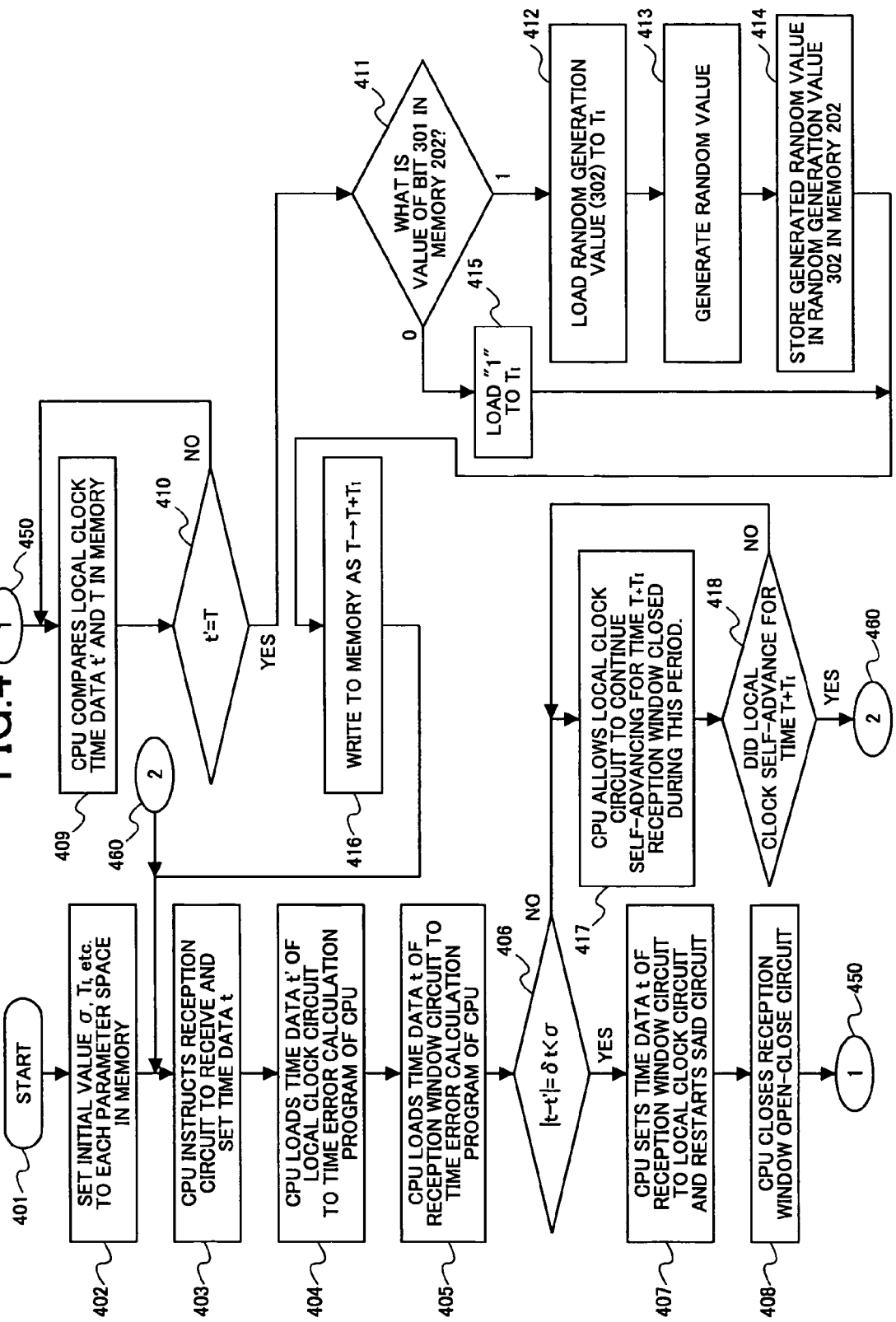
FIG. 4 is a drawing showing a flowchart of an operation according to a second embodiment of the present invention.

FIG. 4 is a drawing showing a flowchart of an operation of the second embodiment of the present invention. Next, the operation of the second embodiment of the present invention is described with reference to the flowchart shown in FIG. 4.

The operation of the second embodiment of the present invention starts from Step 401.

Next, in Step 402, the parameters described with reference to FIG. 3 are set from space 301 to 304, respectively in the memory 302 shown in FIG. 3. The initial value of "periodic (0)/random (1) bit" is set to the space 301, the initial value of "random generation value" is set to the space 302, the initial value of "predetermined value σ" is set to the space 303, the initial value of "time interval value $T_I$" is set to the space 304, and the initial value of "the next time T at which time data t is to be set to the local clock circuit 115".

Next, in Step 403, the CPU 201 commands reception of time data t to the reception circuit 112 by using a control signal 210, and commands the reception window open-close circuit 113 to open the reception window by using a control signal (C2) 211.

Next, in Step 404, the CPU 201 uses a signal 212 to load the time data t' from the local clock circuit 115 to a time error calculation program executed in the CPU 201.

Next, in Step 405, the CPU 201 uses a signal 213 to load the time data t from the reception window open-close circuit 113 to the time error calculation program executed in the CPU 201.

Next, in Step 406, the absolute value δt=|t−t'| of the time difference between the time data t and the time data t' is calculated with the CPU 201. Then, it is determined whether the absolute value δt of the time difference is less than the predetermined value σ. In a case where the absolute value δt of the time difference is determined to be less than the predetermined value σ, the operation proceeds to Step 407.

In Step 407, the CPU 201 controls the local clock circuit 115 by using the control signal (C1) 214 for setting the time data t supplied from the reception window open-close circuit 113 thereto via the signal 212 and then restarting the local clock circuit 115.

Next, in Step 408, the CPU 201 controls the reception window open-close circuit 113 to close the reception window by using the control signal (C2) 211. Then, the operation proceeds to Step 409.

In Step 409, the CPU 201 compares the time data t' in the local clock circuit 115 with the next time T at which time data t is to be set to the local clock circuit 115.

In Step 410, in a case where the time data t' is equal to time T, the operation proceeds to Step 411. On the other hand, in a case where the time data t' is not equal to time T, the operation proceeds to Step 409 to thereby repeat Steps 409 and 410.

In Step 411, it is determined whether the value of the bit 301 in the memory 202 includes "1" or "0". In a case where the value of the bit 301 in the memory 202 includes "1", it is indicated to set the time data t to the local clock circuit 115 at a random time interval, and then, the operation proceeds to Step 412.

In Step 412, the CPU 201 loads the random generation value stored in the space 302 to the time interval value $T_I$ in the space 304 in the memory 202.

Next, in Step 413, the CPU 201 generates a new random generation value.

Next, in Step 414, the CPU 201 stores the newly generated random generation value in the space 302 in the memory 202. Then, the operation proceeds to Step 416.

On the other hand, in Step 411, in a case where the value of the bit 301 in the memory 202 includes "0", it is indicated to periodically set the time data t to the local clock circuit 115, and then, the operation proceeds to Step 415.

In Step 415, the value "1" is loaded to the time interval value $T_I$ in the space 304 in the memory 202. Then, the operation proceeds to Step 416.

In Step 416, $(T+T_I)$ is written to the space 305 in the memory 202 in order to update the next time T at which time data t is to be set to the local clock circuit 115. Then, the operation proceeds to Step 403, and the above-described operation is repeated.

On the other hand, in Step 406, in a case where the absolute value δt of the time difference is determined to be equal to or greater than the predetermined value σ, the operation proceeds to Step 417.

In Step 417, the CPU 201 controls the local clock circuit 115 by using the control signal (C1) 214 for allowing the local clock circuit 115 to self-advance. Then, the reception window open-close circuit 113 is controlled by using the control signal (C2) 211 for closing the reception window.

Next, in Step 418, it is determined whether the local clock circuit 115 has been self-advancing until the time $(T+T_I)$. In a case where the local clock circuit 115 is determined to be self-advancing until the time $(T+T_I)$, the operation proceeds to Step 403, and the above-described operation is repeated. On the other hand, in a case where the local clock circuit 115 is determined to not be self-advancing until the time $(T+T_I)$, the operation proceeds to Step 417, and the Steps 417 and 418 are repeated.

Consequently, the time data t or the time data t' is output from the local clock circuit 115 in the time management apparatus 110 of FIG. 2.

Figure 5:
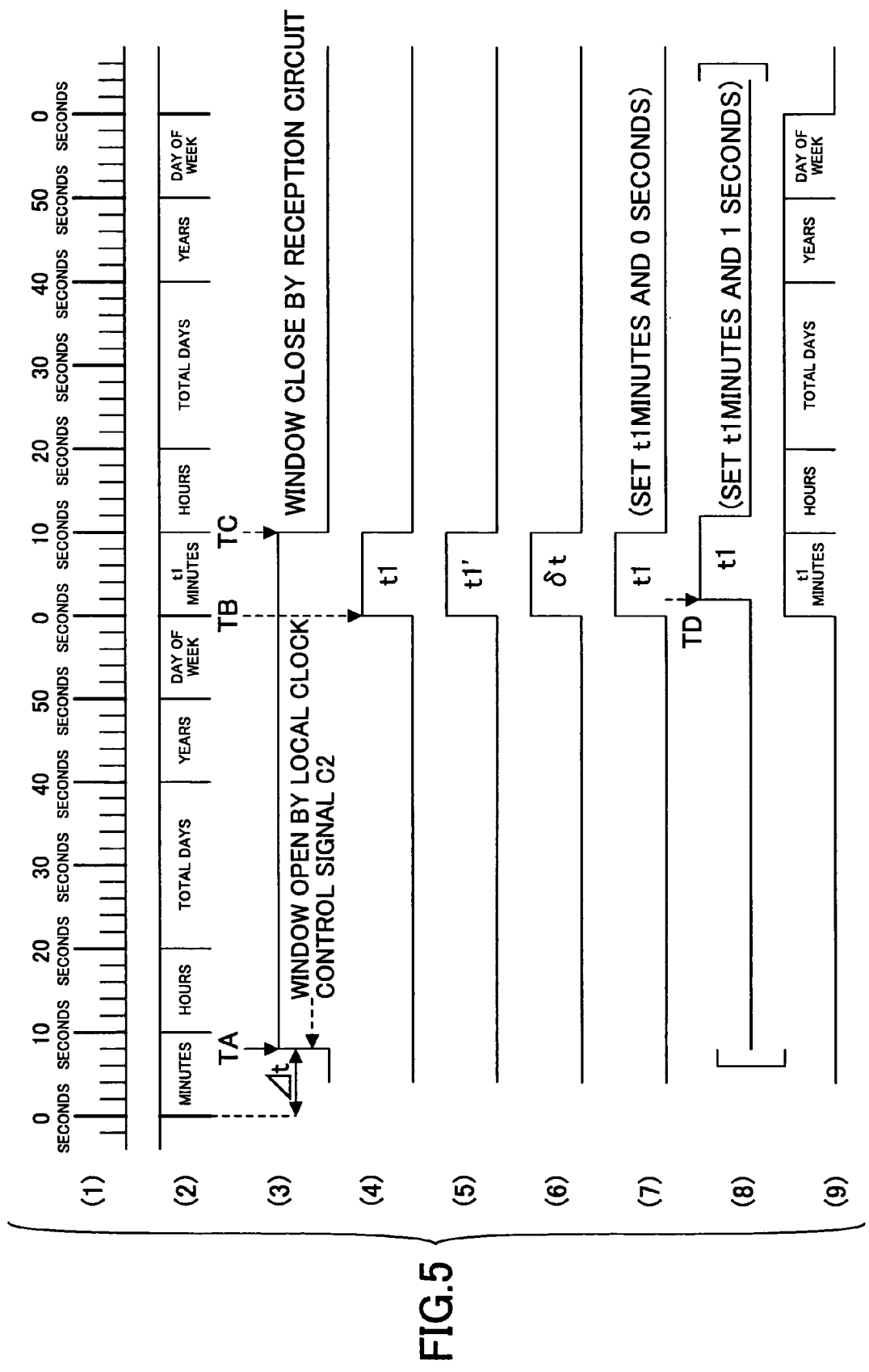
FIG. 5 is a drawing showing a first exemplary time chart of an operation according to a second embodiment of the present invention.

FIG. 5 is a drawing showing a first exemplary time chart of the operation according to the second embodiment of the present invention. In FIG. 5 (1), the time of the time data t transmitted from the radio-wave clock transmission station 101 is expressed in units of "seconds", and the span from 0 seconds to the next 0 seconds correspond to a same minute.

FIG. 5 (2) shows a format of the value of time data t transmitted from the radio-wave clock transmission station. In this example, the value of "minute" is transmitted during the first 10 second period, the value of "hour" is transmitted during the next 10 second period, "total days" are transmitted during the next 20 second period, the value of "year" is transmitted during the next 10 second period, and the "day of week" is transmitted during the final 10 second period.

FIG. 5 (3) shows the reception window of the reception window open-close circuit 113, in which the CPU 201, in accordance with the deviance in the values between the time data t' output from the local clock circuit 115 and the time data t transmitted from the radio-wave clock transmission station 101, opens the reception window at a time TA when there is a deviation of ΔT from the point of 0 seconds. Meanwhile, after the CPU 201 sets the time data t to the local clock circuit 115, the CPU 201 closes the reception window at a time TC.

FIG. 5 (4) shows the timing TB in which the time data t is fetched by the time difference judgment circuit 114. At timing TB, the time difference judgment circuit 114 fetches the time data t1.

FIG. 5 (5) shows the timing TB in which the time data t' is fetched from the local clock circuit 115 by the time difference judgment circuit 114. At the timing TB, the time difference judgment circuit 114 also fetches the time data t'.

FIG. 5 (6) shows the timing in which the absolute value δt=|t−t'| of the time difference between the time data t and the time data t' is calculated by the time difference judgment circuit 114.

FIG. 5 (7) shows the timing in which a new time data t1 is set to the local clock circuit 115 by the time difference judgment circuit 114.

FIG. 5 (8) shows the timing in which the new time data t1 is set to the local clock circuit 115 in a case where there is a delay of approximately 1 second in the timing for setting the new time data t1 with the time difference judgment circuit 114. Even in a case of such delay, the time data t1 transmitted from the radio-wave clock transmission station 101 can be detected in units of seconds as shown in FIG. 5 (1). Therefore, the time data t1 can be precisely set to the local clock circuit 115 in accordance with the time data t1 transmitted from the radio-wave clock transmission station 101 by shifting 1 second during the setting process.

Finally, FIG. 5 (9) shows output time data t1 of the local clock circuit 115 after the time data t1 is newly set.

Figure 6:
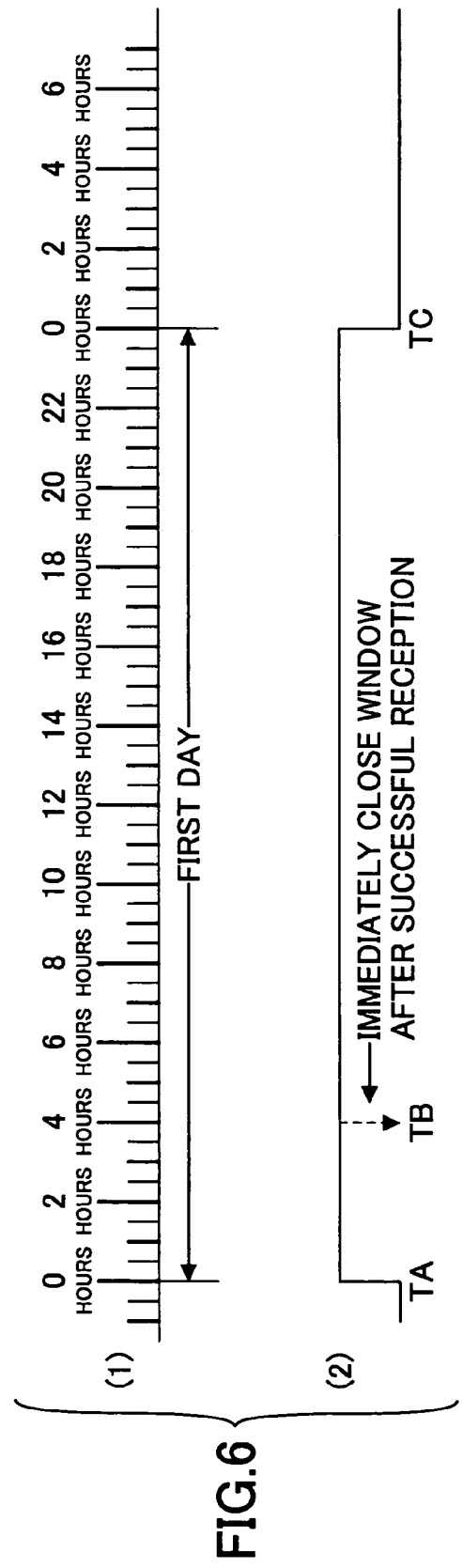
FIG. 6 is a drawing showing a second exemplary time chart of an operation according to a second embodiment of the present invention.

FIG. 6 is a drawing showing a second exemplary time chart of the operation according to the second embodiment of the present invention.

FIG. 6 shows a configuration where the reception window of the reception window open-close circuit 113 is opened in units of "days".

In FIG. 6 (1), the time of the time data t transmitted from the radio-wave clock transmission station 101 is expressed in units of "hours", and the span from 0 hours to the next 0 hours correspond to the same day.

FIG. 6 (2) shows the reception window of the reception window open-close circuit 113 which is opened at timing TA. Then, the reception window of the reception window open-close circuit 113 is closed at a timing TB in which the time data t was able to be set to the local clock circuit 115. Furthermore, in a case where the time data t was unable to be set to the local clock circuit 115 by timing TC at the end of the day, the reception window open-close circuit 113 is closed at the timing TC.

Figure 7:
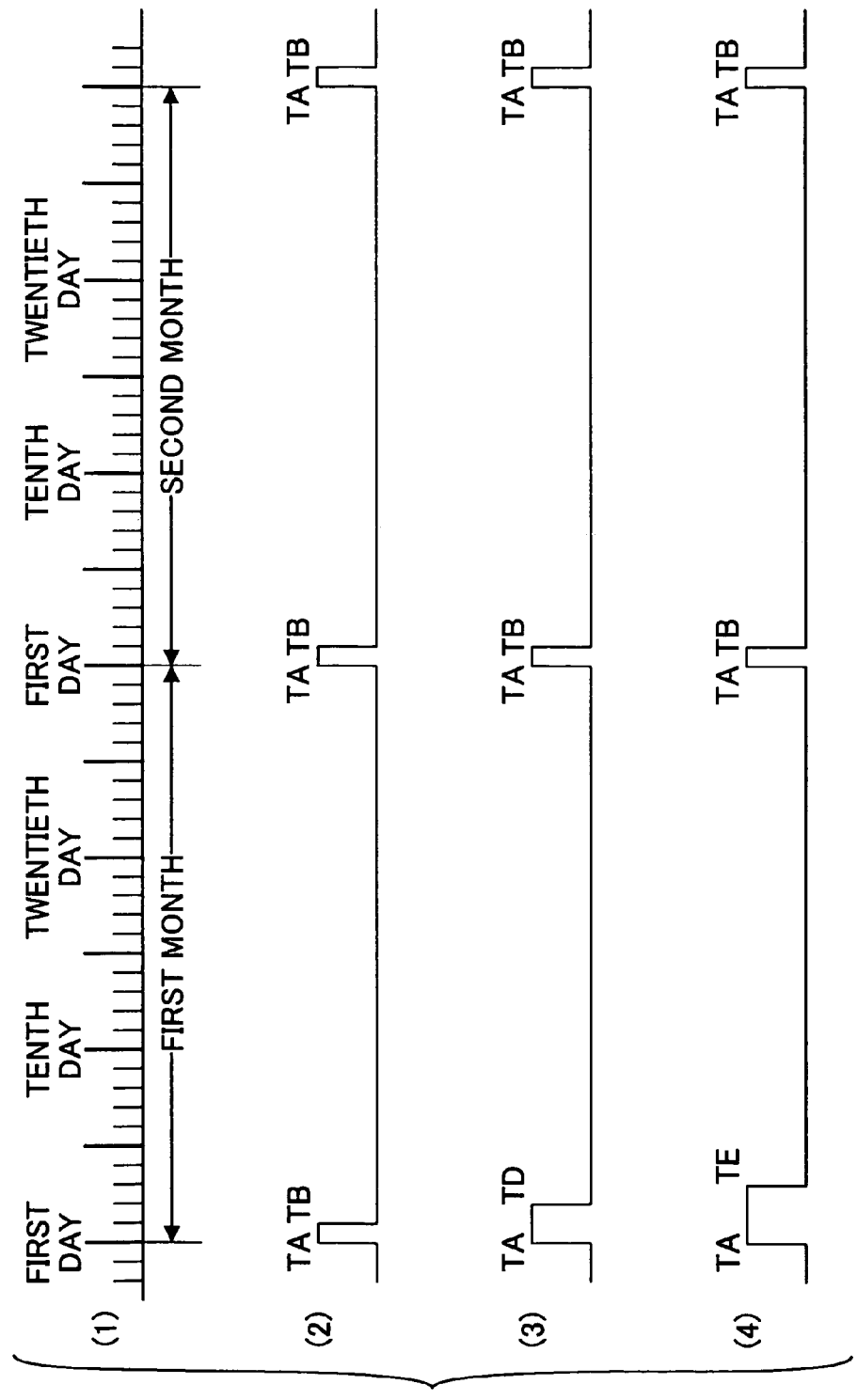
FIG. 7 is a drawing showing a third exemplary time chart of an operation according to a second embodiment of the present invention.

FIG. 7 is a drawing showing a third exemplary timing chart of the operation according to the second embodiment of the present invention. FIG. 7 shows a configuration where the reception window of the reception window open-close circuit 113 is opened in units of "months".

In FIG. 7 (1), the time of the time data t transmitted from the radio-wave clock transmission station 101 is expressed in units of "days", and the span from 0 days to the next 0 days correspond to the same month.

FIG. 7 (2) shows the timing for opening and closing the reception window open-close circuit 113. The reception window of the reception window open-close circuit 113 is opened at a first timing Ta on the first day. Then, the reception window of the reception window open-close circuit 113 is closed at a timing TB in which the time data t was able to be set to the local clock circuit 115. The operation during the period between the timing TA to the timing TB is same as that described with FIG. 7.

FIG. 7 (3) shows a case where the time data t was unable to be set to the local clock circuit 115 on the first day. In this case, for example, the reception window open-close circuit 113 is opened until the second day, and the same operation described with FIG. 7 is performed. FIG. 7 (4) shows a case where the time data t was unable to be set to the local clock circuit 115 on neither the first or second day. In this case, for example, the reception window open-close circuit 113 is opened until the third day, and the same operation described with FIG. 7 is performed.

Next, a third embodiment of the present invention is described.

Figure 8:
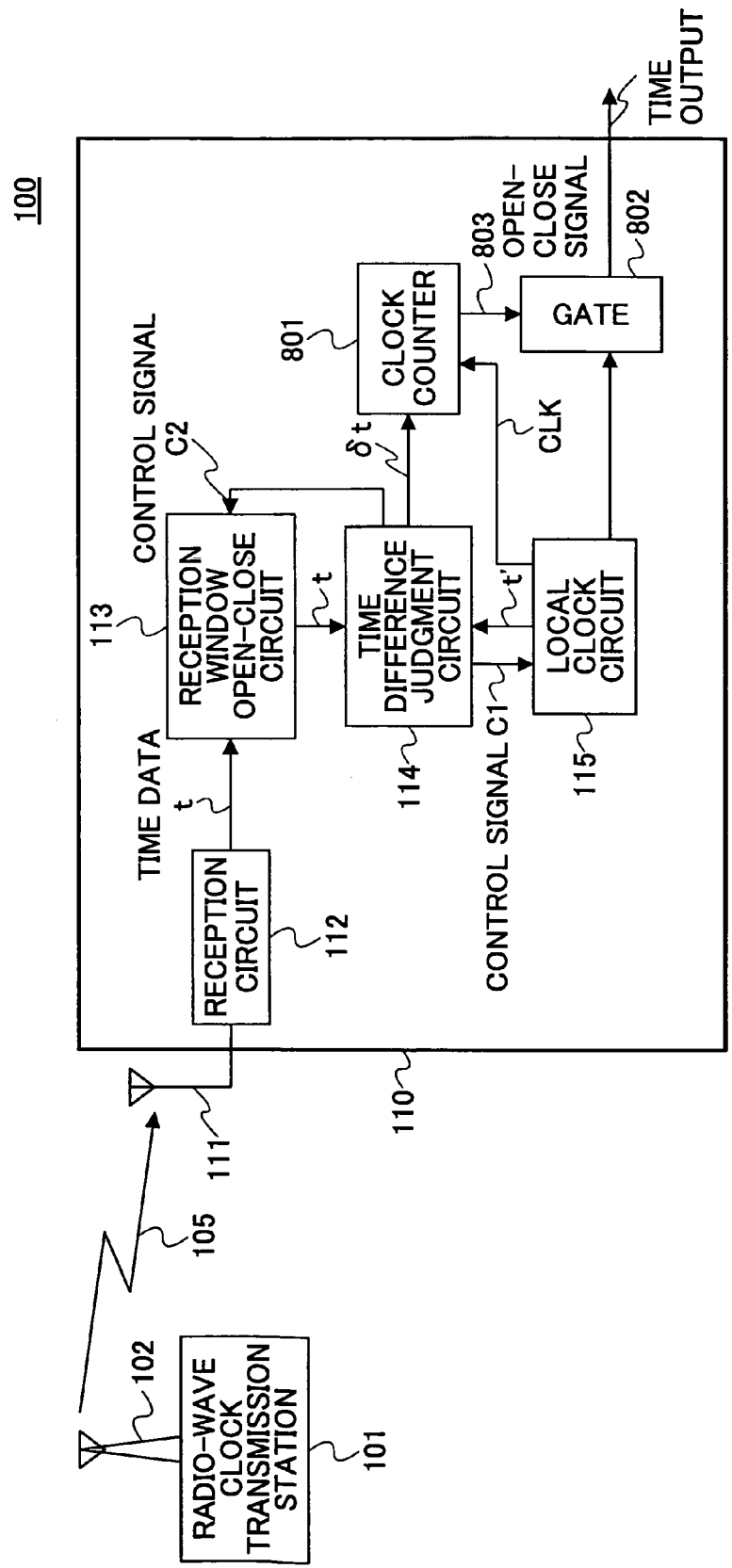
FIG. 8 is a drawing showing a third embodiment of a principle of the present invention.

FIG. 8 is a drawing showing a time management system 100 in the third embodiment for showing a principle of the present invention. This embodiment is an embodiment where the local time indicated by the local clock circuit 115 to the time management apparatus 110 is earlier than the external time information 105 transmitted from outside. The third embodiment shown in FIG. 8 is different from the first embodiment shown in FIG. 1 in that the third embodiment shown in FIG. 8 includes a clock counter 801 and a gate part 802.

The absolute value δt=|t−t'| of the time difference between the time data t and the time data t' calculated by the time difference judgment circuit 114 and a clock CLK output from the local clock circuit 115 are input to the clock counter 801 and an open-close signal 803 is output therefrom to a gate part 802.

The gate part 802 controls the outputting of time data supplied from the local clock circuit 115 in accordance with the open-close signal 803 output from the clock counter 801.

The reception circuit 112 in the time management apparatus 110 shown in FIG. 8 receives the external time information 105 from the radio-wave clock transmission station 101, and then supplies it as time data t to the reception window open-close circuit 113. The format of the external time information 105 is described below with reference to FIG. 5.

The local clock circuit 115, after once being set to an initial value, self-advances and outputs time data t'.

The reception window open-close circuit 113 opens a reception window according to a control signal C2 supplied from the time difference judgment circuit 114, and sends time data t input during this interval to the time difference judgment circuit 114.

Meanwhile, the local clock circuit 115 also supplies time data t' to the time difference judgment circuit 114.

The time difference judgment circuit 114 calculates the absolute value δt of the difference between the time date t and the time data t'. Then, in a case where the absolute value δt is less than a predetermined value σ, the time control difference judgment circuit 114 controls the local clock circuit 115 for enabling the time data t to be set thereto by using a time set control signal C1. On the other hand, in a case where the absolute value δt is equal to or greater than the predetermined value σ, the time control difference judgment circuit 114 controls the local clock circuit 115 for enabling the local clock circuit 115 to continue self-advancing by using the time set control signal C1.

Here, in a case where the local time indicated by the local clock circuit 115 of the time management apparatus 110 is earlier than the external time information 105 supplied from outside, the time output from the time management apparatus 110 slightly returns to a time of the past when the external time information 105 supplied from outside is fetched into the time management apparatus 110.

In the third embodiment, the time difference judgment circuit 114 sets the absolute value δt to the clock counter 801 in a case of controlling the local clock circuit 115 to set the time data t thereto by using the time set control signal C1. Then, the clock counter 801 controls by using the open-close signal 803 for closing the gate part 802. Then, the clock counter 801 is counted up by the clock CLK. Then, the clock counter 801 controls by using the open-close signal 803 for opening the gate part 802 when the count value reaches the set absolute value δt.

Next, after the local clock circuit 115 is controlled for setting the time data t thereto and restarting or for self-advancing by the control signal C1, the time control difference judgment circuit 114 closes the reception window of the reception window open-close circuit 113 by using the control signal C2. Thereby, the local clock circuit 115 is allowed to self-advanced since no time data t input from the reception circuit 112 to the reception window open-close circuit 113 is supplied to the time control difference judgment circuit 114.

Then, when reaching a predetermined time T, the time control difference judgment circuit 114 once again sends a control signal C2 to the reception window open-close circuit 113 and controls the reception window for allowing it to open. Accordingly, the foregoing operation is repeated.

Accordingly, a time management system 110, which is strong against time tampering and also able to provide a highly accurate time for a long period, can be obtained. Furthermore, the time output from the time management apparatus 110 is a credible time which does not return to a time point of such time.

Next, a fourth embodiment of the present invention is described in further detail with reference to FIGS. 9, 10, 11 and 12.

Figure 9:
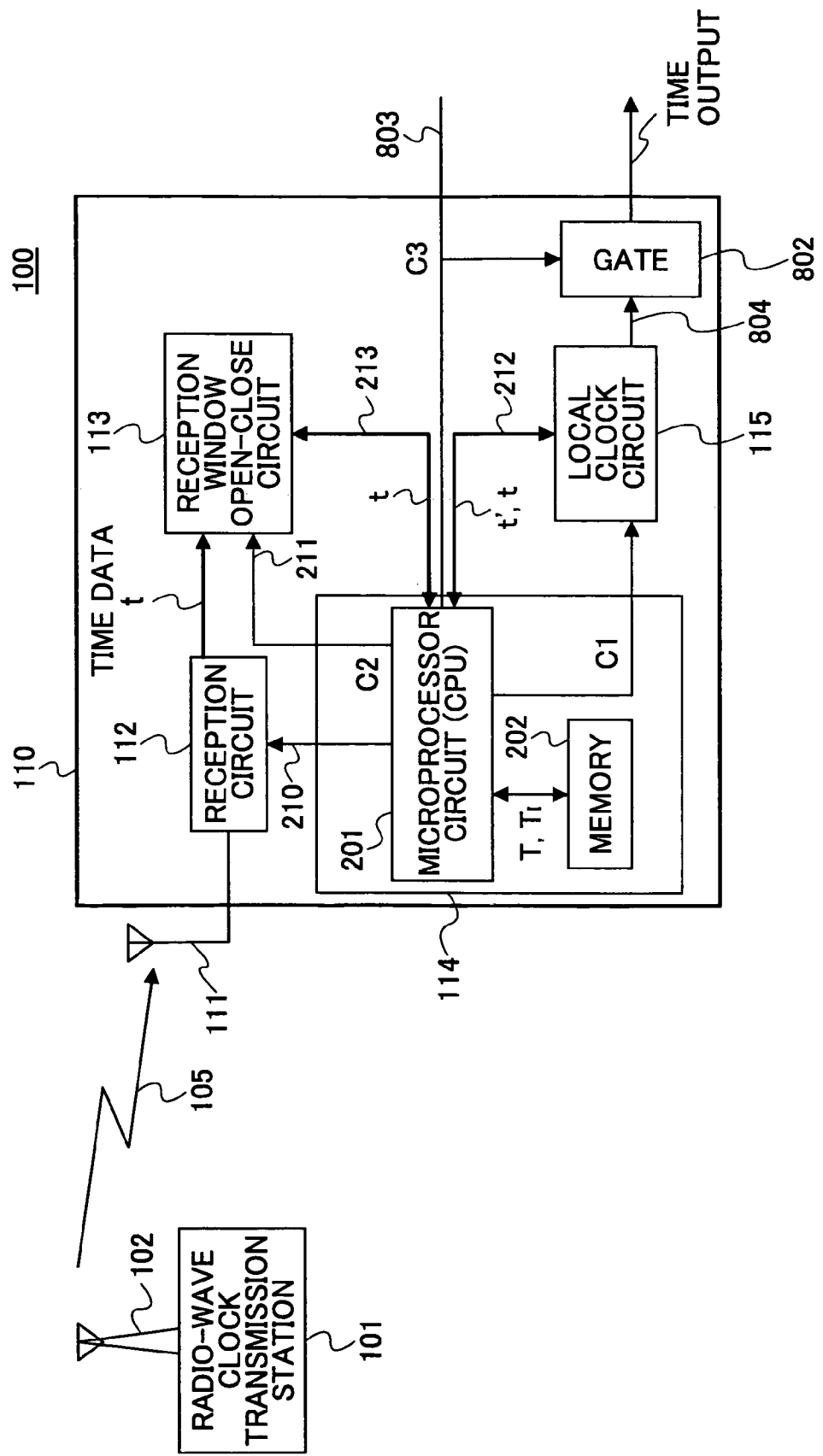
FIG. 9 is a drawing showing a configuration of a fourth embodiment of the present invention.

FIG. 9 is a drawing showing a configuration of the fourth embodiment of the present invention. This embodiment is an embodiment where the local time indicated by the local clock circuit 115 is earlier than the external time information 105 supplied from outside. In FIG. 9, like components are denoted by like numerals as of FIG. 2. The fourth embodiment shown in FIG. 9 is different from the second embodiment shown in FIG. 2 in that the third embodiment shown in FIG. 9 has a CPU 201 which includes a clock counter function and a gate part 802.

The operation of the clock counter function and the gate part 802 is the same as that of the third embodiment described with reference to FIG. 8.

Figure 10:
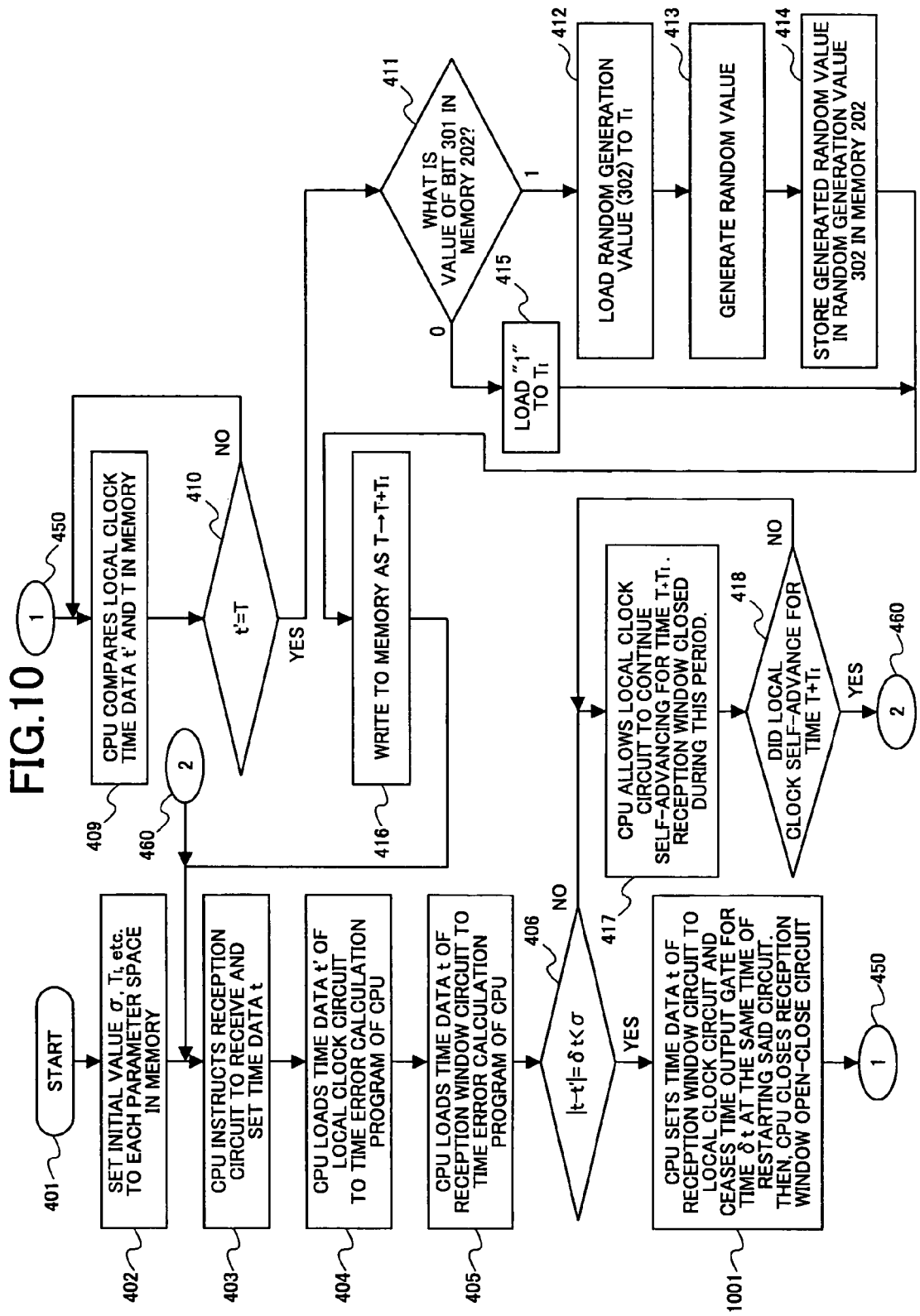
FIG. 10 is a drawing showing a flowchart of an operation according to a fourth embodiment of the present invention.

FIG. 10 is a drawing showing a flowchart of an operation according to the fourth embodiment of the present invention. In FIG. 10, like components are denoted with like numerals as of FIG. 4.

The difference between the flowchart of the operation according to the fourth embodiment of the present invention shown in FIG. 10 and the flowchart of the operation of the second embodiment of the present invention shown in FIG. 4 is that Step 407 in FIG. 4 is replaced with Step 1001 in FIG. 10.

In Step 406 in FIG. 10, the CPU 201 calculates the absolute value δt=|t−t'| of the time difference between the time data t and the time data t'. Then, it is determined whether the absolute value δt is less than a predetermined value σ. In a case where the is determined the absolute value δt is determined to be less than the predetermined value σ, the operation proceeds to Step 1001.

In Step 1001, the CPU 201 controls the local clock circuit 115 by using the time set control signal C1 for setting the time data t thereto. In this case, the open-close signal 803 is output from the CPU 201, thus controls the gate part 802 so that it may close. Then, the clock CLK counts up the clock counter function inside the CPU 201. Then, the gate part 803 is controlled with the open-close signal 803 so that it may close when the count value reaches the predetermined absolute value δt. Thereby, the time output from the time management apparatus 110 can be prevented from returning to a time in the past.

Figure 11:
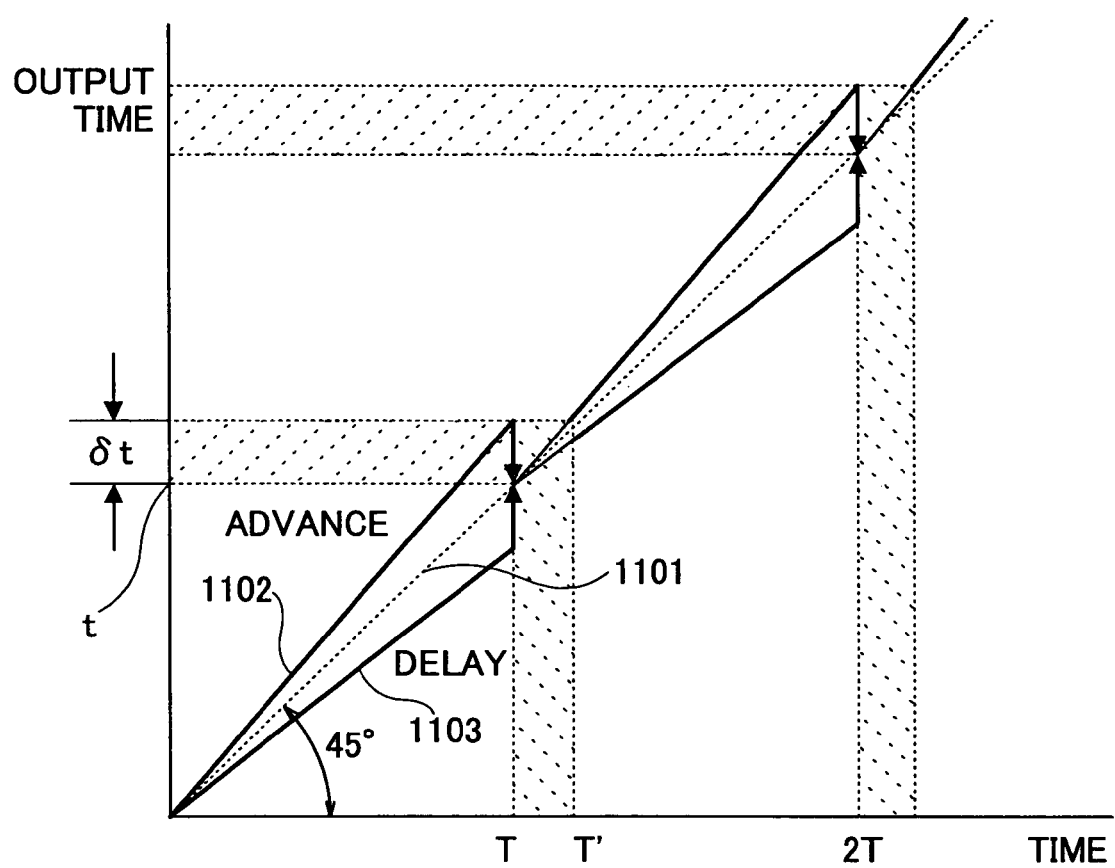
FIG. 11 is a drawing showing a time chart of an operation according to a fourth embodiment of the present invention.

FIG. 11 is a drawing showing a time chart of the operation according to the fourth embodiment of the present invention. The horizontal axis in FIG. 11 indicates the elapsing of time according to the external time information 105 transmitted from the radio-wave clock transmission station 101. On the other hand, the vertical axis in FIG. 11 indicates the elapsing of time according to the self-advance clock of the local clock circuit 115.

In a case where there is a match between the elapsing rate of time for the time of the external time information 105 and the time of the self-advance clock of the local clock circuit 115, the elapsed time for the time of the external time information 105 and the elapsed time for the time of the self-advance clock of the local clock circuit 115 match as illustrated with a straight line 1101 with an increased angle of 45 degrees. Meanwhile, in a case where the elapsing rate of time for the time of the self-advance clock of the local clock circuit 115 is faster than the elapsing rate of time for the time of the external time information 105, the self-advance clock of the local clock circuit 115 advances as illustrated with a straight line 1102. In a case where the elapsing rate of time for the time of the self-advance clock of the local clock circuit 115 is slower than the elapsing rate of time for the time of the external time information 105, the self-advance clock of the local clock circuit 115 is delayed as illustrated with a straight line 1103.

Here, in a case where the local clock circuit 115 is advanced, as shown with the straight line 1102, if the time data t from the external time information 105 is set to the local clock circuit 115 at time T, the time output from the local clock circuit 115 at the time T would return to a past time output from the local clock circuit 115, thereby reducing the credibility of the time stamp.

Therefore, after the time data t from the external time information 105 is set as the output time for the local clock circuit 115 at time T, the gate part 802 restricts output from the time management apparatus 110 for a period corresponding to the absolute value δt of the time difference between the time data t and the time data t'. This equals to a cease of time output from the time management apparatus 110 during the period between time T and time T'. Furthermore, after the elapse of this period, that is, when the output of time is commenced at time T', the local clock circuit 115 can be prevented from returning to a past output time.

It is to be noted that, since time would not return to a past time when the local clock time is matched to the external time information 105 in a case where the local clock time output from the local clock circuit 115 is delayed, it is not required to cease output during the period of δt.

Figure 12:
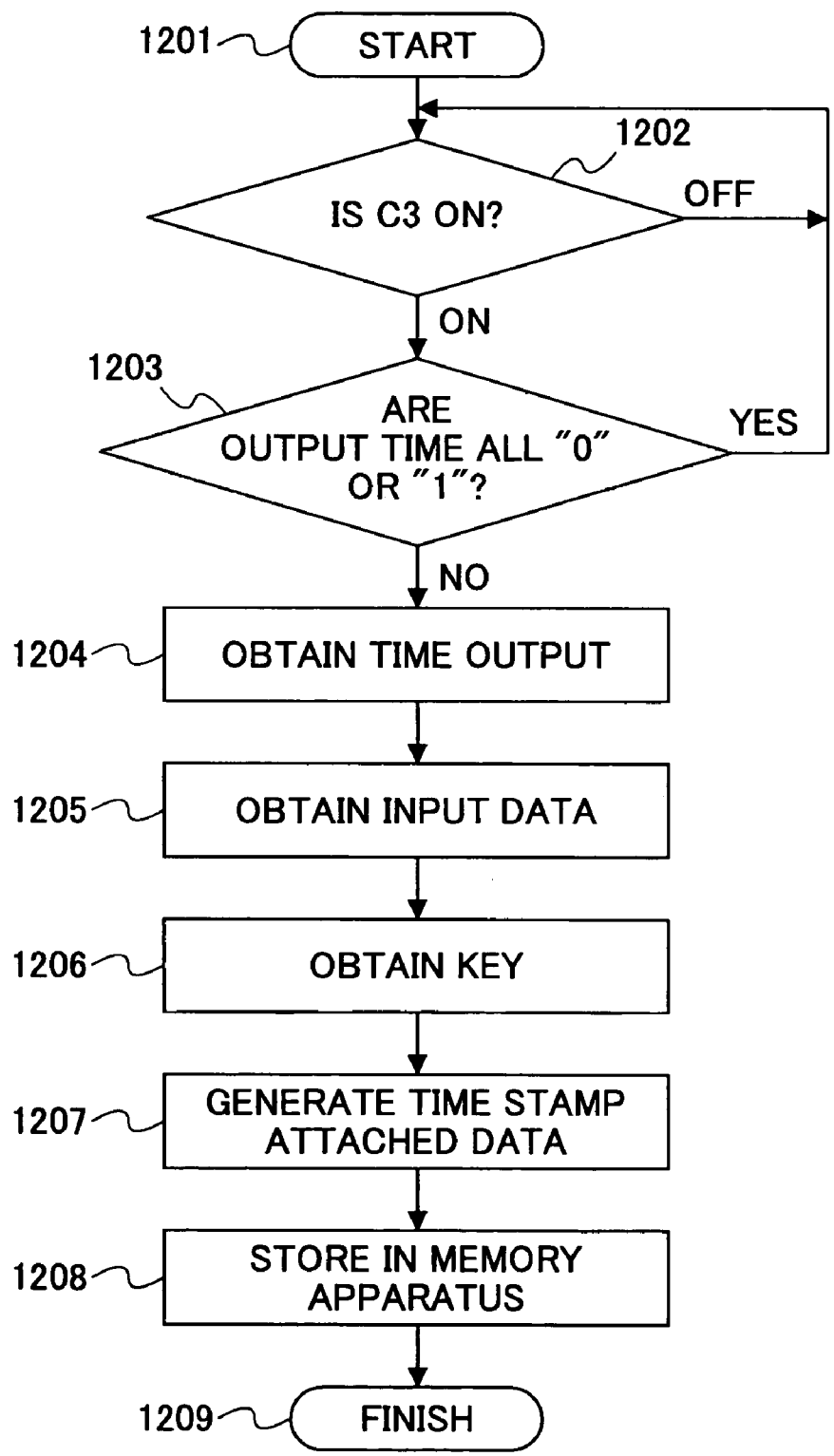
FIG. 12 is a drawing showing a flowchart of an operation of a signature system using a fourth embodiment of the present invention.

FIG. 12 is a drawing showing a flowchart of an operation of a signature system using the fourth embodiment of the present invention. For example, it is executed by software or the like for a signature system.

In Step 1201, the operation of the present signature system is started.

Next, in Step 1202, the software of the signature system determines whether the open-close signal 803 shown in FIG. 9 is on or off. Here, in a case where the open-close signal 803 is on, the gate part 802 of FIG. 9 allows the local clock 804 output from the local clock circuit 115 to be output from the time management apparatus 110. In a case where the open-close signal 803 is off, Step 1202 is repeated.

Next, in Step 1203, the software of the signature system determines whether the time output from the time management apparatus 110 are all 0 or all 1. When it is either one of the cases, the operation returns to Step 1202 and the operation is repeated until a normal time is output. When it is neither one of the cases, the operation proceeds to Step 1204.

In Step 1204, the software of the signature system receives time output sent from the local clock circuit via the gate.

In Step 1205, the software of the signature system obtains input data targeted for signature.

Next, in Step 1206, the software of the signature system obtains a key.

Next, in Step 1207, the software of the signature system generates data attached with a time stamp by using the input data, the time output, and the key.

Then, in Step 1208, the software of the signature system stores the generated data attached with the time stamp in a memory apparatus.

Finally, in Step 1209, the process of the software of the signature system is finished.

Accordingly, time stamp attached data can be generated with software or the like of the signature system using the present invention.

Next, a fifth embodiment of the present invention is described.

Figure 13:
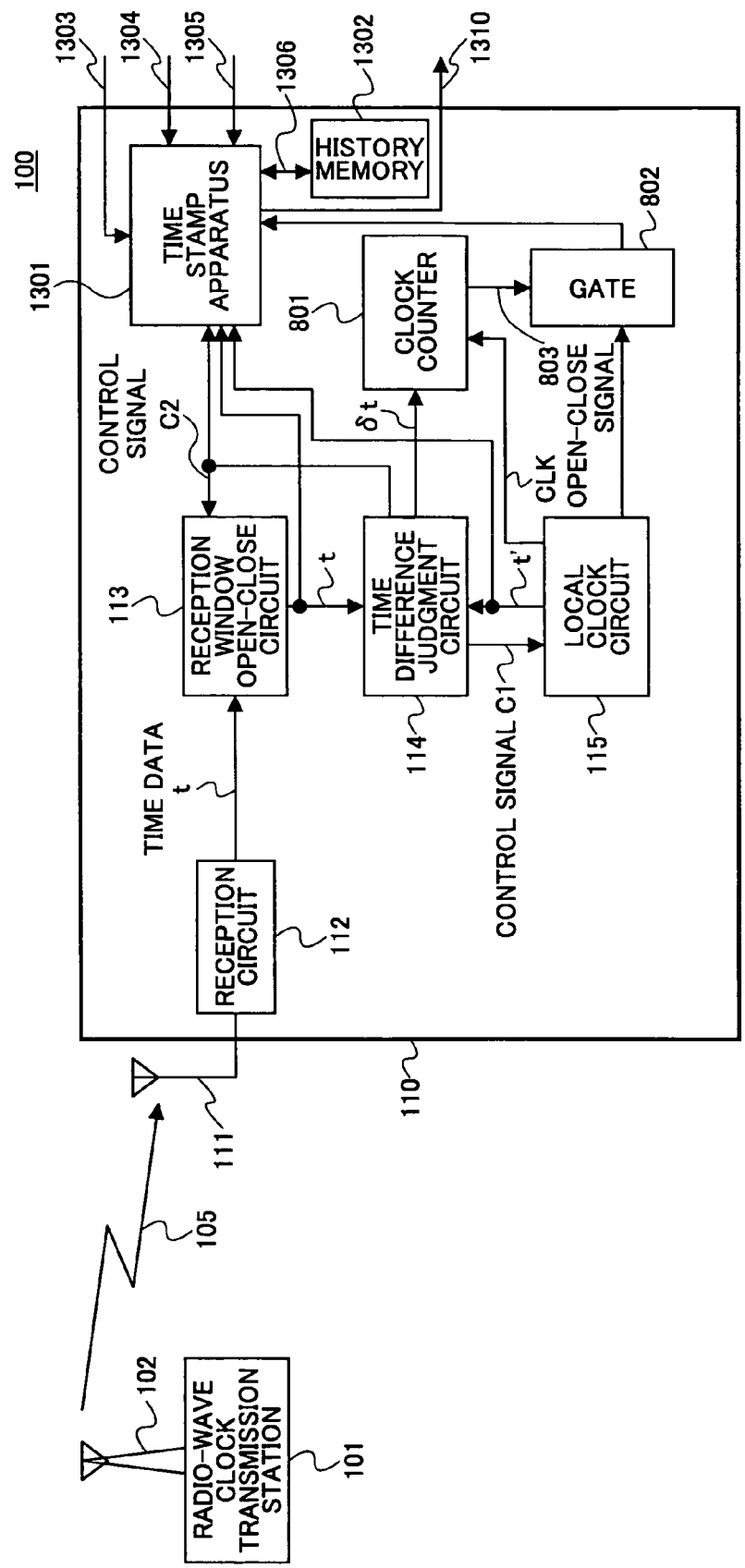
FIG. 13 is a drawing showing a fifth embodiment of a principle of the present invention.

FIG. 13 is a drawing showing a time management system 100 in the fifth embodiment for showing a principle of the present invention. This embodiment is an embodiment for particularly providing a certifying part for valid clock use.

In FIG. 13, like components are denoted with like numerals as of FIG. 8. The difference between the third embodiment shown in FIG. 8 and the fifth embodiment shown in FIG. 13 is that the fifth embodiment shown in FIG. 13 includes a time stamp apparatus 1301 and a history memory 1302 connected to the time stamp apparatus 1301, and that an output signal of the gate part 802 is supplied to the time stamp apparatus 1301. Furthermore, a signature key setting input 1303, a request output mode input 1304, and an electronic message input 1305 are input to the time stamp apparatus 1301. A signature attached time, a time stamp attached electronic message, and a time stamp attached time issue history are output therefrom.

FIG. 14 is a drawing showing an example of the content of the history memory 1302. The history memory 1302 includes a space for storing a radio-wave reception time t', a radio-wave clock time t, a signature issue time ts, an error absolute value δt, and an authentication code CS. Furthermore, reference numerals 1410, 1411, 1412, and 1413 indicate records of automatic time generation inside the time management apparatus 110. Furthermore, reference numerals 1420 and 4121 indicate records of time stamp(s) issued by a request from a user side.

Next, the operation of the fifth embodiment shown in FIG. 13 is described with reference to FIG. 14. In FIG. 13, operations of the components denoted with like numerals as of FIG. 8 are the same as the operations of the third embodiment shown in FIG. 8.

First, a key of the user, that is, an authentication code CS, is set to the time stamp apparatus 1301 via the signature key setting input 1303.

Next, the time stamp apparatus 1301 periodically receives valid time information t from the outside via the reception circuit 112 and the reception window open-close circuit 113 for proving that the time management apparatus 110 always uses valid time information. Then, the time difference judgment circuit 114 obtains the time difference δt between the received valid time information t and the time information t' generated in the local clock circuit 115.

Then, the received valid time information t and the time difference δt are sent to the time stamp apparatus 1301 and signed with the user's key CS1. Then, as shown in FIG. 14, radio-wave reception time t1', radio-wave clock time t1, error absolute value δt1 and authentication code CS are stored as automatic time generation records 1410 in the time history memory 1302 inside the time management apparatus 110.

Then, in a case of issuing a time stamp to a document generated in an operation process, a time stamp issue request and a electronic message are input from the request output mode input 1304 and the electronic message input 1305. A time stamp is attached to the input electronic message, and the time stamp attached electronic message is output from the output 1310 in FIG. 13.

Furthermore, the time stamp generation time ts 11, ts 12, . . . , ts 1m, which are the issued time stamps generated in the local clock circuit, are signed by the user's key in the same manner described above and are stored as time stamp records 1420 issued under the request of the user in the time history memory 1302 inside the time management apparatus 110. In the time stamp records 1420 issued by the request of the user, the time stamp issue time ts 11, ts 12, . . . , ts 1m are sequentially stored as time stamp records 1420 issued by the request of the user together with the authentication codes CS 11, CS 12, CS1.

A radio-wave reception time t2', a radio-wave clock time t2, an error absolute value δt2 and authentication code CS2 are sequentially stored as automatic time generation records 1411, as shown in FIG. 14, in the time history memory 1302 inside the time management apparatus 110.

Next, in the same manner described above, time stamp issue time ts 21 and ts 12 are sequentially stored as time stamp records 1421 issued under the request of the user in the time history memory 1302 together with authentication codes CS 21 and CS 22.

Furthermore, the automatic time generation records 1412 and 1413 are stored in the time history memory 1302 at radio-wave reception times t3' and t4'.

Accordingly, the received valid time information t and the time difference δt are signed with the user's key. In the same manner, the signature generation time ts generated in the local clock circuit 115 is also signed with the user's key. Then, the records of the automatic time generation and the records of the time stamp issued by the request of the user are stored in the time history memory 1302 in the time management apparatus 110. Then, when a problem regarding the credibility of the time stamp time arises, the time stamp attached time issue history in the records of the automatic time generation and the signature attached time in the records of the time stamp issued by the request of the user are output by the output 1310, to thereby provide an certifying part for enabling use of a valid clock based on the output information.

Next, a sixth embodiment of the present invention is described in further detail with reference to FIGS. 15, 16 and 17.

Figure 15:
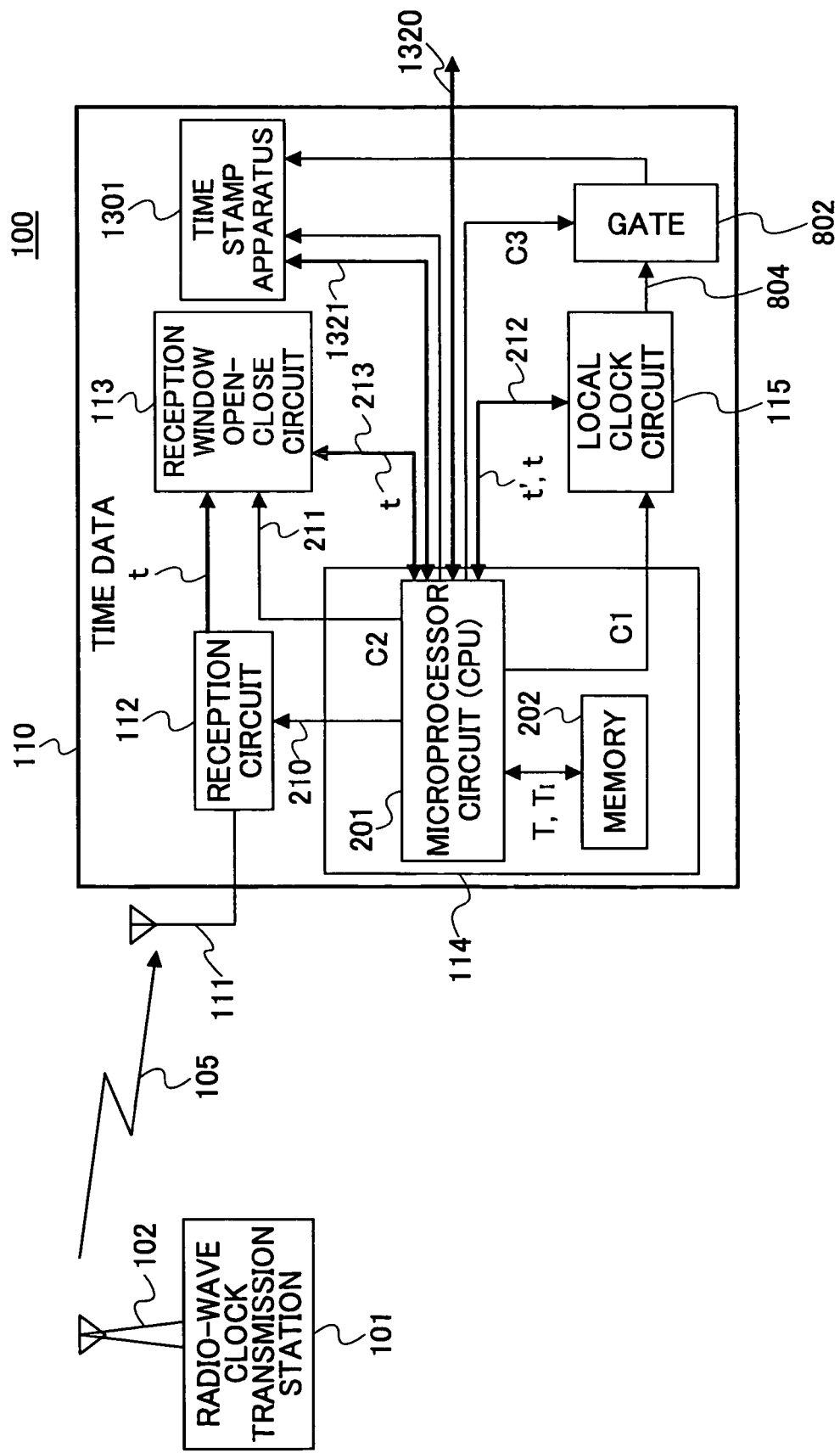
FIG. 15 is a drawing showing a configuration according to a sixth embodiment of the present invention.

FIG. 15 is a drawing showing a configuration of the sixth embodiment of the present invention. This embodiment is particularly an embodiment which provides a certifying part for enabling use of a valid clock. In FIG. 15, like components are denoted with like numerals as of FIG. 9. The difference between the fourth embodiment shown in FIG. 9 and the sixth embodiment shown in FIG. 15 is that the sixth embodiment shown in FIG. 15 includes a time stamp apparatus 1301, in which an output signal of the gate part 802 is supplied to the time stamp apparatus 1301. Furthermore, an signature key setting input, a request output mode input, and an electronic message input are input to the CPU 201 via an input-output bus 1320, and are further input from the CPU 201 to the time stamp apparatus 1301 via the signal line 1321. Furthermore, the signature attached time, the time stamp attached electronic message, and the time stamp attached time issue history are input to the CPU 201 via the time stamp apparatus 1301 and the signal line 1321, and are then output from the CPU 201 to the output 1320 via the input-output bus 1320.

Next, an operation of the sixth embodiment shown in FIG. 15 is described. In FIG. 15, operations of the components denoted with like numerals as of FIG. 9 are the same as the operations of the fourth embodiment shown in FIG. 9.

Figure 16:
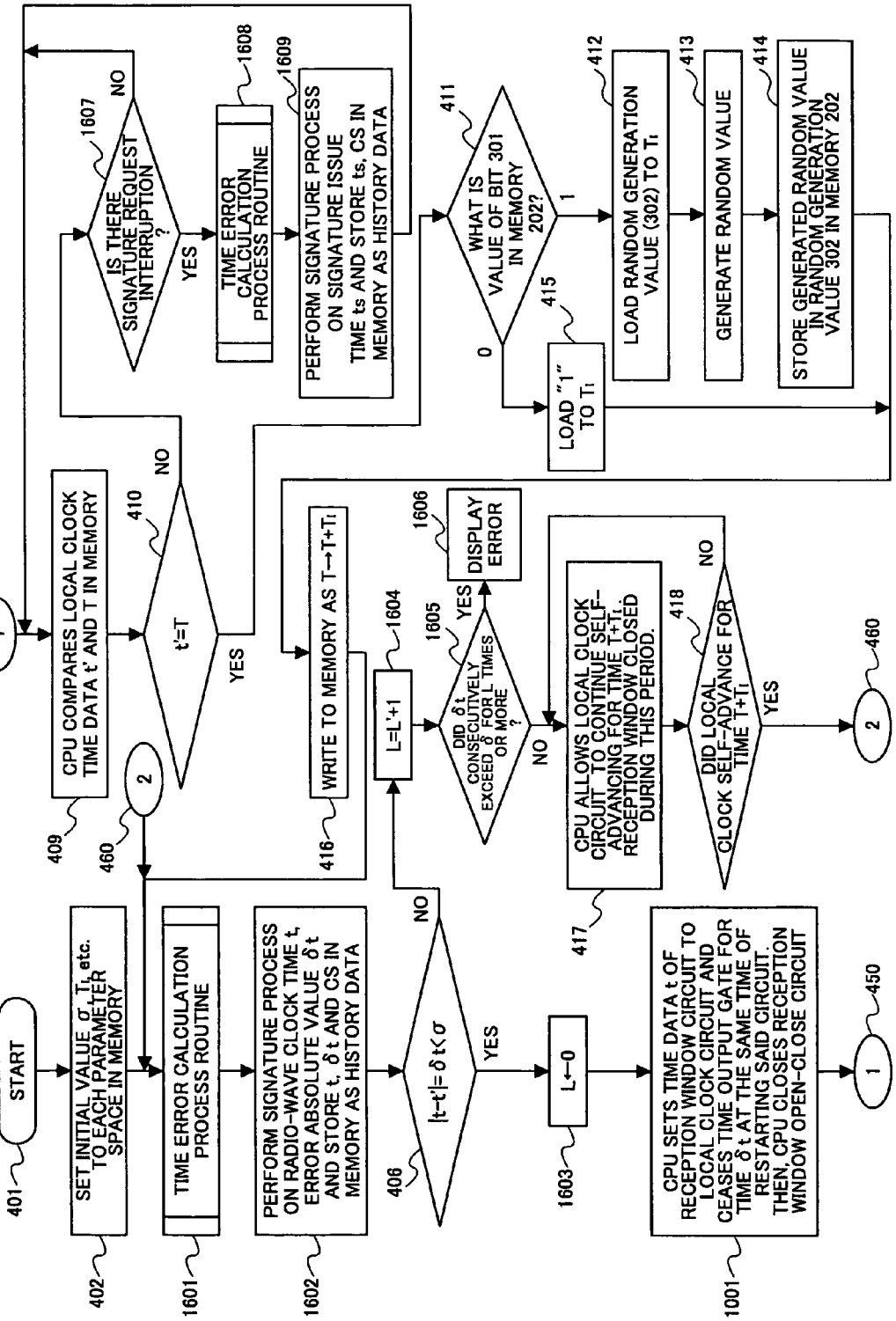
FIG. 16 is a drawing showing a flowchart of an operation according to a sixth embodiment of the present invention.
Figure 17:
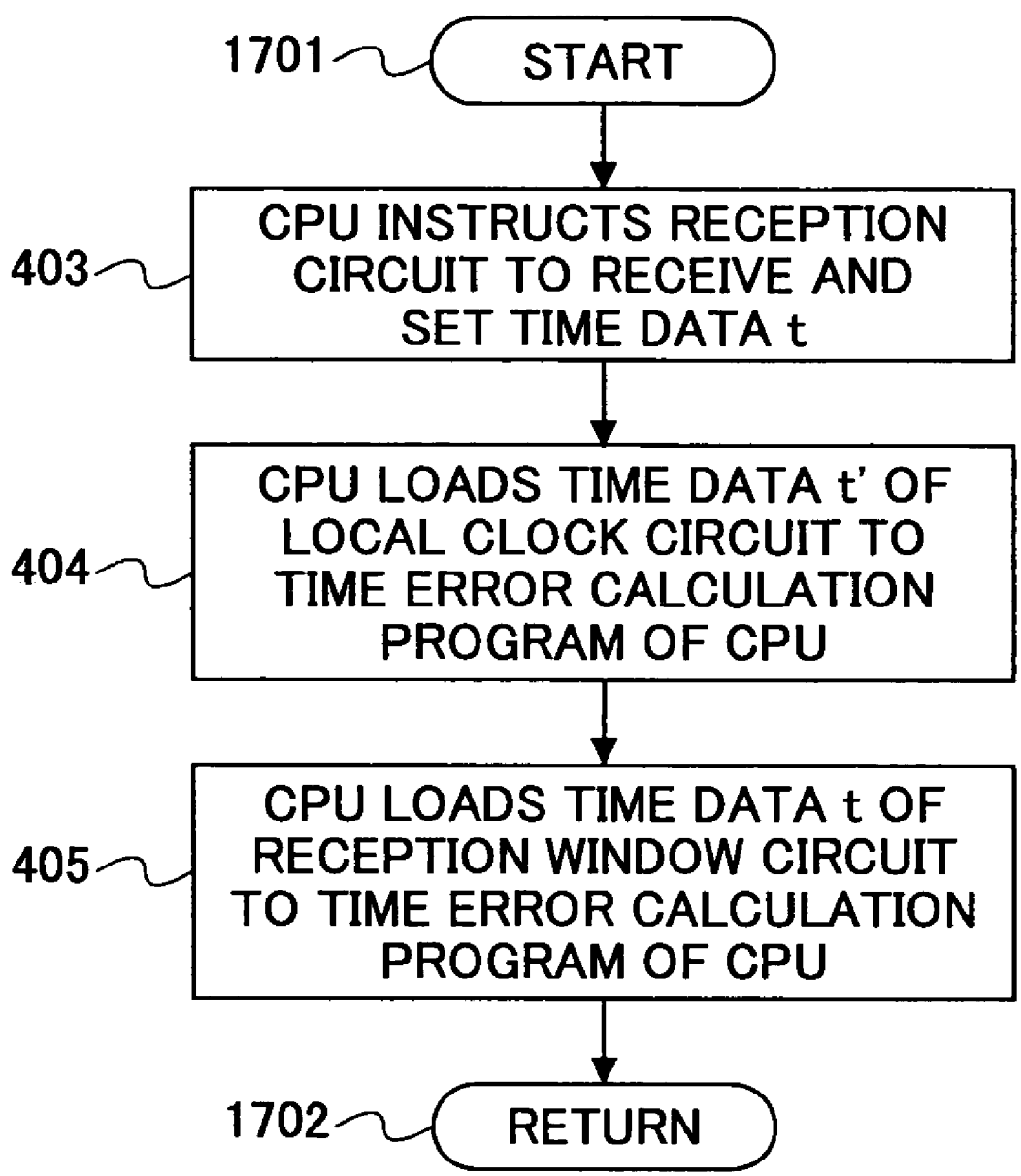
FIG. 17 is a drawing showing a time error calculation process routine of an operation according to a sixth embodiment of the present invention.

FIGS. 16 and 17 are drawings showing the operation according to the sixth embodiment of the present invention. In FIG. 16, steps denoted with like numerals as of FIG. 10 are the same as those of FIG. 10. Furthermore, FIG. 17 shows a time error calculation process routine, in which the time error calculation process routine starts from Step 1701, executes the same operations as Steps 403, 404 and 405 of FIG. 10, and executes a return process in Step 1702.

The difference between the flowchart of FIG. 10 showing the operation according to the fourth embodiment of the present invention and the flowchart of FIGS. 16 and 17 showing the operation according to the sixth embodiment of the present invention is that Steps 403 to 405 of FIG. 10 are executed in Step 1601 of FIG. 16 and that Steps 1602, 1603, 1604, 1605, 1606, 1607, 1608, and 1609 are added.

In Step 1601 of FIG. 16, the same processes as of Steps 402, 403, and 404 of FIG. 10 are performed as shown in Steps 402, 403 and 404 of FIG. 17.

Next, in Step 1602, the time stamp apparatus 1301 performs a signature process using the authentication code on the radio-wave clock time t and the error absolute value δt, and then stores t, δt, and CS in the time history memory which forms a part of the space in the memory 202 connected to the CPU 15, as shown in the above-described fifth embodiment shown with reference to FIG. 14.

Next, in Step 406 of FIG. 16, the CPU 201 calculates the absolute value δt=|t−t'| of the time difference between the time data t and the time data t'. Then, it is determined whether the absolute value δt of the time difference is less than the predetermined value σ. In a case where the absolute value δt of the time difference is determined to be less than the predetermined value σ, the operation proceeds to Step 1603.

In Step 1603, 0 is substituted to a parameter L. Then, the operation proceeds to Step 1001.

In Step 1001, the CPU 201 controls the local clock circuit 115 to set the time data t thereto by using the time setting control signal C1. In this case, the CPU 201 outputs the open-close signal 803, thereby controlling to close the gate part 802. Next, the clock counter function in the CPU 201 is counted up with the clock CLK. Then, when the count value reaches to the set absolute value δt, the gate part 802 is controlled to open by the open-close signal 803. Accordingly, the time output from the time management apparatus 110 can be prevented from returning to a time point of the past.

Next, in Step 406, when it is determined that the absolute value δt of the time difference is equal to or greater than the predetermined value σ, the operation proceeds to Step 1604.

In Step 1604, the parameter L is increased by 1, and then the operation proceeds to Step 1605.

In Step 1605, it is determined whether the δt consecutively exceeded the predetermined value σ for a predetermined number of times based on the parameter L. When δt is determined to consecutively exceed the predetermined value a for a predetermined number of times, the operation proceeds to Step 1606.

Then, in Step 1606, it is displayed that a predetermined error has occurred.

Meanwhile, in Step 1605, when δt is determined to have not consecutively exceed the predetermined value σ for a predetermined number of times, the operation proceeds to Step 417. The operation of Step 417 is the same as that shown in FIG. 10.

After the above-described operation of Step 1001 is completed, the operation proceeds to Step 409.

As described with FIGS. 4 and 10, in Step 409, the CPU 201 compares the time data t' of the local clock circuit 115 with the next time T at which time data t is to be set to the local clock circuit 115.

In Step 410, in a case where the time data t' is equal to T, the operation proceeds to Step 411. On the other hand, in a case where the time data t' is not equal to T, the operation proceeds to Step 1607.

In Step 1607, it is determined whether an interruption is made to a signature request to the electronic message via the input-output bus 1320. In a case where the signature request to the electronic message is executed, the operation proceeds to Step 1608. In a case where the signature request is not executed, the operation proceeds to Step 409, and Step 409 and Step 410 are repeated.

In Step 1608, the time error calculation process routine described with reference to FIG. 17 is performed again. After Step 1608 is completed, the operation proceeds to Step 1609.

In Step 1609, the time stamp apparatus 1301 shown in FIG. 15 performs the signature operation on the signature issue time ts and outputs the time stamp attached electronic message via the input-output bus 1320. In addition, the signature issue time ts and the authentication code CS are stored in the time history memory which forms a part of the space in the memory 202 connected to the CPU 201 of FIG. 15. Then, the operation proceeds to Step 409, and Step 409 and Step 410 are repeated.

In Step 410, in a case where the time data t' is equal to T, the operation proceeds to Step 411, and the operation described with reference to FIG. 4 and FIG. 10 is repeated.

Accordingly, the received valid time information-t and the time difference δt are signed with the user's key. In the same manner, the signature generation time ts generated in the local clock circuit 115 is also signed with the user's key. Then, the records of the automatic time generation and the records of the time stamp issued by the request of the user are stored in the time history memory in the time management apparatus 110. Then, when a problem regarding the credibility of the time stamp time arises, the time stamp attached time issue history in the records of the automatic time generation and the signature attached time in the records of the time stamp issued by the request of the user are output by the input-output bus 1320, to thereby provide an certifying part for enabling use of a valid clock based on the output information.

Next, a seventh embodiment of the present invention is described. The seventh embodiment of the present invention is an embodiment for allowing a smooth transition from local time t' to the time t of a radio-wave clock in a case where a time management apparatus, which is operating only according to a local clock in a state situated at a location where radio-waves cannot be received, inside a desk, for example, receives a time from a radio-wave clock.

In the seventh embodiment, the consecutive number of times of radio-clock reception errors is set as L times, and in a case where the time difference |t−t'| is less than L times the initial value $\sigma_0$ of $\sigma$, the radio-wave clock time t is used. On the other hand, in a case where the time difference |t−t'| is equal to or greater than L times the initial value $\sigma_0$ of $\sigma$, error is displayed and an operation for ceasing the operation of the time management apparatus is executed.

Figure 18:
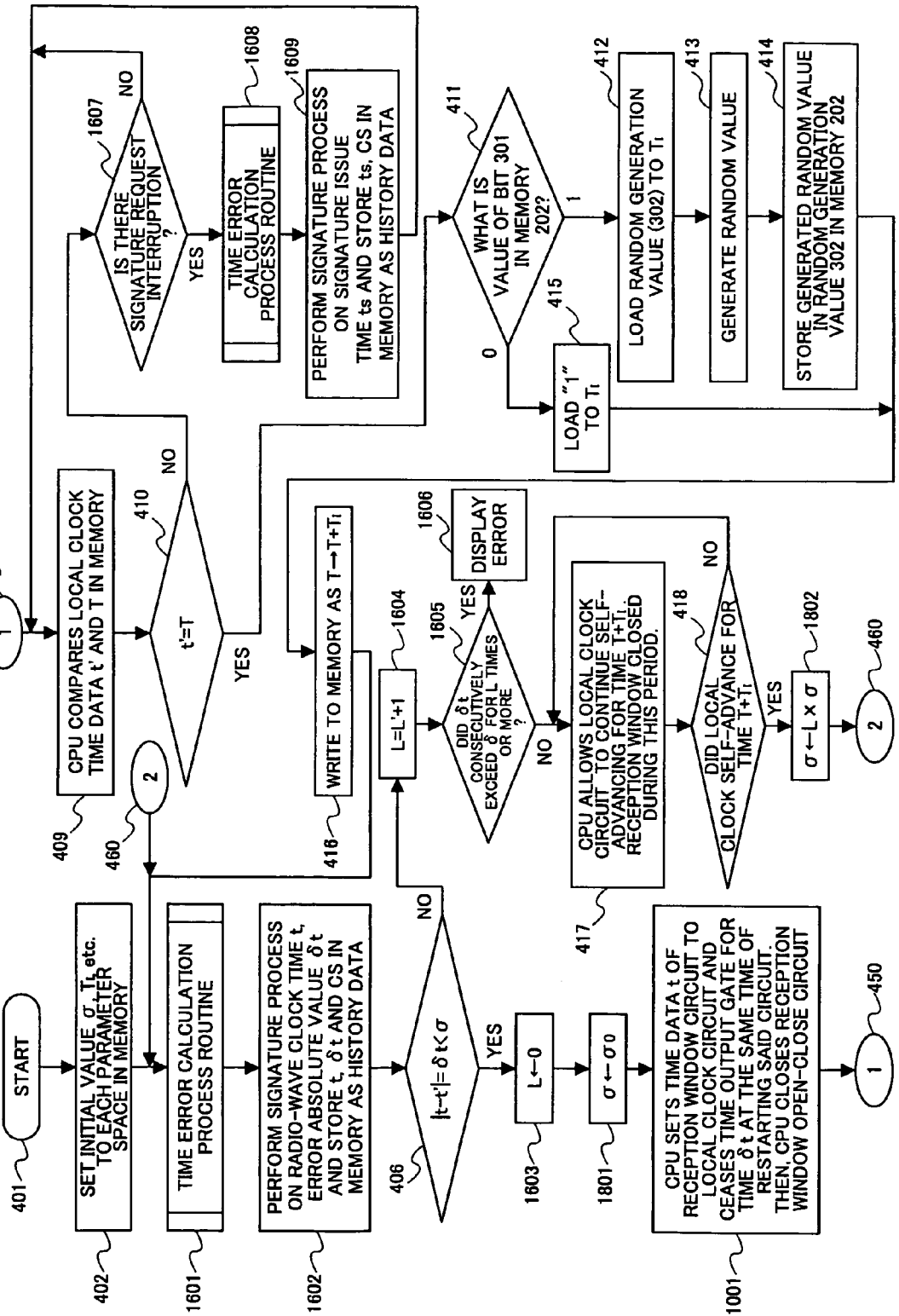
FIG. 18 is a drawing showing a flowchart of an operation (in a case of consecutive reception error) according to a seventh embodiment of the present invention.

FIG. 18 and FIG. 17 are drawings showing a flowchart of the operation according to the seventh embodiment of the present invention. In FIG. 18, steps denoted with like numerals as of FIG. 16 are the same as those of FIG. 16. Furthermore, FIG. 17 shows a time error calculation process routine, in which the time error calculation process routine starts from Step 1701, executes the same operations as Steps 403, 404 and 405 of FIG. 10, and executes a return process in Step 1702.

The difference between the flowchart of FIG. 16 showing the operation according to the sixth embodiment of the present invention and the flowchart of FIG. 15 showing the operation according to the seventh embodiment of the present invention is that that Step 1802 is added between Steps 418 and 460 of FIG. 16 and that Step 1801 is added between Steps 1603 and 1001 of FIG. 16.

In Step 1601 of FIG. 18, the same processes as of Steps 402, 403, and 404 of FIG. 10 are performed as shown in Steps 402, 403 and 404 of FIG. 17.

Next, in Step 1602, the time stamp apparatus 1301 performs a signature process using the authentication code on the radio-wave clock time t and the error absolute value δt, and then stores t, δt, and CS in the time history memory which forms a part of the space in the memory 202 connected to the CPU 15, as shown in the above-described fifth embodiment shown with reference to FIG. 14.

Next, in Step 406 of FIG. 18, the CPU 201 calculates the absolute value δt=|t−t'| of the time difference between the time data t and the time data t'. Then, it is determined whether the absolute value δt of the time difference is less than the predetermined value σ. In a case where the absolute value δt of the time difference is determined to be less than the predetermined value σ, the operation proceeds to Step 1603.

In Step 1603, 0 is substituted to a parameter L. Then, as shown in Step 1801, the initial value $\sigma_0$ is reset to parameter σ, and then the operation proceeds to Step 1001.

In Step 1001, the CPU 201 controls the local clock circuit 115 to set the time data t thereto by using the time setting control signal C1. In this case, the CPU 201 outputs the open-close signal 803, thereby controlling to close the gate part 802. Next, the clock counter function in the CPU 201 is counted up with the clock CLK. Then, when the count value reaches to the set absolute value δt, the gate part 802 is controlled to open by the open-close signal 803. Accordingly, the time output from the time management apparatus 110 can be prevented from returning to a time point of the past.

Next, in Step 406, when it is determined that the absolute value δt of the time difference is equal to or greater than the predetermined value σ, the operation proceeds to Step 1604.

In Step 1604, the parameter L is increased by 1, and then the operation proceeds to Step 1605.

In Step 1605, it is determined whether the δt consecutively exceeded the predetermined value σ for a predetermined number of times based on the parameter L. When δt is determined to consecutively exceed the predetermined value a for a predetermined number of times, the operation proceeds to Step 1606.

Then, in Step 1606, it is displayed that a predetermined error has occurred.

Meanwhile, in Step 1605, when δt is determined to have not consecutively exceed the predetermined value σ for a predetermined number of times, the operation proceeds to Step 417. The operation of Step 417 is the same as that shown in FIG. 10.

After the above-described operation of Step 1001 is completed, the operation proceeds to Step 409.

As described with FIGS. 4 and 10, in Step 409, the CPU 201 compares the time data t' of the local clock circuit 115 with the next time T at which time data t is to be set to the local clock circuit 115.

In Step 410, in a case where the time data t' is equal to T, the operation proceeds to Step 411. On the other hand, in a case where the time data t' is not equal to T, the operation proceeds to Step 1607.

In Step 1607, it is determined whether an interruption is made to a signature request to the electronic message via the input-output bus 1320. In a case where the signature request to the electronic message is executed, the operation proceeds to Step 1608. In a case where the signature request is not executed, the operation proceeds to Step 409, and Step 409 and Step 410 are repeated.

In Step 1608, the time error calculation process routine described with reference to FIG. 17 is performed again. After Step 1608 is completed, the operation proceeds to Step 1609.

In Step 1609, the time stamp apparatus 1301 shown in FIG. 15 performs the signature operation on the signature issue time ts and outputs the time stamp attached electronic message via the input-output bus 1320. In addition, the signature issue time ts and the authentication code CS are stored in the time history memory which forms a part of the space in the memory 202 connected to the CPU 201 of FIG. 15. Then, the operation proceeds to Step 409, and Step 409 and Step 410 are repeated.

In Step 410, in a case where the time data t' is equal to T, the operation proceeds to Step 411, and the operation described with reference to FIG. 4 and FIG. 10 is repeated.

Accordingly, the received valid time information t and the time difference δt are signed with the user's key. In the same manner, the signature generation time ts generated in the local clock circuit 115 is also signed with the user's key. Then, the records of the automatic time generation and the records of the time stamp issued by the request of the user are stored in the time history memory in the time management apparatus 110. Then, when a problem regarding the credibility of the time stamp time arises, the time stamp attached time issue history in the records of the automatic time generation and the signature attached time in the records of the time stamp issued by the request of the user are output by the input-output bus 1320, to thereby provide an certifying part for enabling use of a valid clock based on the output information.

Further, the present invention is not limited to these embodiments, but various variations and modifications may be made without departing from the scope of the present invention.

What is claimed is:

1. A time management method comprising:
an external time fetching step for fetching an external time within a predetermined time span;
a local clock step for outputting a self-advance time; and
a time difference judgment step for calculating a difference between the external time fetched by the external time fetching step and the self-advance time output by the local clock step, setting the external time to the local clock step in a case where the difference is less than a predetermined value, and not setting the external time to the local clock step in a case where the difference is equal to or greater than a predetermined value;

wherein in a case where the external time cannot be fetched within the predetermined time span in the external time fetching step, the predetermined time span is extended and the fetching of the external time in the external time fetching step is continued.

2. The time management method as claimed in claim 1, wherein the fetching of the external time in the external time fetching step is executed at a periodic time interval.

3. The time management method as claimed in claim 1, wherein the fetching of the external time in the external time fetching step is executed at a random time interval.

4. A time management apparatus comprising:
an external time fetching part for fetching an external time within a predetermined time span;
a local clock part for outputting a self-advance time; and
a time difference judgment part for calculating a difference between the external time fetched by the external time fetching part and the self-advance time output by the local clock part, setting the external time to the local clock part in a case where the difference is less than a predetermined value, and not setting the external time to the local clock part in a case where the difference is equal to or more than a predetermined value;
wherein in a case where the external time cannot be fetched within the predetermined time span by the external time fetching part, the predetermined time span is extended and the fetching of the external time by the external time fetching part is continued.

5. The time management apparatus as claimed in claim 4, wherein the fetching of the external time by the external time fetching part is executed at a periodic time interval.

6. The time management apparatus as claimed in claim 4, wherein the fetching of the external time in the external time fetching part is executed at a random time interval.

7. A time management method comprising:
an external time fetching step for fetching an external time within a predetermined time span;
a local clock step for outputting a self-advance time;
a time difference judgment step for calculating a difference between the external time fetched by the external time fetching step and the self-advance time output by the local clock step, setting the external time to the local clock step in a case where the difference is less than a predetermined value, and not setting the external time to the local clock step in a case where the difference is equal to or greater than a predetermined value; and
a time output ceasing step for ceasing output of time in the local clock step in a case where the external time set to the local clock step is a time of the past with respect to a time output in the local clock step immediately before setting the external time to the local clock step, until the time output in the local clock step reaches the time of the past output in the local clock step immediately before setting the external time to the local clock step.

8. The time management method as claimed in claim 7, wherein the fetching of the external time in the external time fetching step is executed at a periodic time interval.

9. The time management method as claimed in claim 8, wherein in a case where the external time cannot be fetched within the predetermined time span in the external time fetching step, the predetermined time span is extended and the fetching of the external time in the external time fetching step is continued.

10. The time management method as claimed in claim 7, wherein the fetching of the external time in the external time fetching step is executed at a random time interval.

11. The time management method as claimed in claim 10, wherein in a case where the external time cannot be fetched within the predetermined time span in the external time fetching step, the predetermined time span is extended and the fetching of the external time in the external time fetching step is continued.

12. A time management apparatus comprising:
an external time fetching part for fetching an external time within a predetermined time span;
a local clock part for outputting a self-advance time;
a time difference judgment part for calculating a difference between the external time fetched by the external time fetching part and the self-advance time output by the local clock part, setting the external time to the local clock part in a case where the difference is less than a predetermined value, and not setting the external time to the local clock part in a case where the difference is equal to or more than a predetermined value; and
a time output ceasing part for ceasing output of time by the local clock part in a case where the external time set to the local clock part is a time of the past with respect to a time output by the local clock part immediately before setting the external time to the local clock part, until the time output by the local clock part reaches the time of the past output by the local clock part immediately before setting the external time to the local clock part.

13. The time management apparatus as claimed in claim 12, wherein the fetching of the external time by the external time fetching part is executed at a periodic time interval.

14. The time management apparatus as claimed in claim 13, wherein in a case where the external time cannot be fetched within the predetermined time span by the external time fetching step, the predetermined time span is extended and the fetching of the external time by the external time fetching part is continued.

15. The time management apparatus as claimed in claim 12, wherein the fetching of the external time in the external time fetching part is executed at a random time interval.

16. The time management apparatus as claimed in claim 15, wherein in a case where the external time cannot be fetched within the predetermined time span by the external time fetching part, the predetermined time span is extended and the fetching of the external time by the external time fetching part is continued.

17. A time management method comprising:
an external time fetching step for fetching an external time within a predetermined time span;
a local clock step for outputting a self-advance time;
a time difference judgment step for calculating a difference between the external time fetched by the external time fetching step and the self-advance time output by the local clock step, setting the external time to the local clock step in a case where the difference is less than a predetermined value, and not setting the external time to the local clock step in a case where the difference is equal to or greater than a predetermined value;
a step for generating a first authentication code by performing a signature on the self-advance time, the external time, and the difference by using a predetermined key;
a step for storing the self-advance time, the external time, the difference, and the first authentication code;
a reception step for receiving a signature issue command;
a step for generating a second authentication code by performing a signature by using a predetermined key at a predetermined signature issue time in accordance with the signature issue command received in the reception step; and a step for storing the signature issue time and the second signature authentication code.

18. The method as claimed in claim 17, further comprising an error occurrence displaying step for displaying occurrence of a predetermined error when the difference between the external time fetched in the external time fetching step and the self-advance time output in the local clock step, being calculated in the time difference judgment step, is detected to be a difference that is equal to or greater than a predetermined value for a predetermined consecutive number of times.

19. A time management apparatus comprising:

an external time fetching part for fetching an external time within a predetermined time span;

a local clock part for outputting a self-advance time;

a time difference judgment part for calculating a difference between the external time fetched by the external time fetching part and the self-advance time output by the local clock part, setting the external time to the local clock part in a case where the difference is less than a predetermined value, and not setting the external time to the local clock part in a case where the difference is equal to or greater than a predetermined value;

a part for generating a first authentication code by performing a signature on the self-advance time, the external time, and the difference by using a predetermined key;

a part for storing the self-advance time, the external time, the difference, and the first authentication code;

a reception part for receiving a signature issue command;

a part for generating a second authentication code by performing a signature by using a predetermined key at a predetermined signature issue time in accordance with the signature issue command received by the reception part; and a part for storing the signature issue time and the second signature authentication code.

20. The apparatus as claimed in claim 19, further comprising an error occurrence displaying part for displaying occurrence of a predetermined error when the difference between the external time fetched by the external time fetching part and the self-advance time output in the local clock part, being calculated in the time difference judgment part, is detected to be a difference that is equal to or greater than a predetermined value for a predetermined consecutive number of times.

\* \* \* \* \*